US010517210B2

(12) United States Patent
Cabrera et al.

(10) Patent No.: US 10,517,210 B2
(45) Date of Patent: Dec. 31, 2019

(54) MULTI-MODE TRIMMER HEAD

(71) Applicant: MTD PRODUCTS INC, Valley City, OH (US)

(72) Inventors: Oscar Cabrera, Valley City, OH (US); Robert Johnson, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 106 days.

(21) Appl. No.: 15/439,561

(22) Filed: Feb. 22, 2017

(65) Prior Publication Data

US 2017/0238461 A1    Aug. 24, 2017

Related U.S. Application Data

(60) Provisional application No. 62/298,177, filed on Feb. 22, 2016, provisional application No. 62/332,260, filed on May 5, 2016.

(51) Int. Cl.
*A01D 34/416* (2006.01)
*A01D 34/73* (2006.01)

(52) U.S. Cl.
CPC ....... *A01D 34/4166* (2013.01); *A01D 34/416* (2013.01); *A01D 34/4163* (2013.01); *A01D 34/733* (2013.01)

(58) Field of Classification Search
CPC ............ A01D 34/4166; A01D 34/4163; A01D 34/733; A01D 34/73
See application file for complete search history.

(56) References Cited

U.S. PATENT DOCUMENTS

| | | | |
|---|---|---|---|
| 4,035,912 A * | 7/1977 | Ballas | A01D 34/416 30/276 |
| 4,137,694 A | 2/1979 | Hopper | |
| 4,189,905 A | 2/1980 | Frantello | |
| 4,190,954 A * | 3/1980 | Walto | A01D 34/4166 30/347 |
| 4,202,094 A | 5/1980 | Kalmar | |

(Continued)

FOREIGN PATENT DOCUMENTS

| CN | 2 582 345 | 10/2003 |
|---|---|---|
| EP | 2 737 788 | 6/2014 |

OTHER PUBLICATIONS

International Search Report and Written Opinion for International Patent Application No. PCT/US2017/018915 dated Jul. 5, 2017.

*Primary Examiner* — Jonathan G Riley
(74) *Attorney, Agent, or Firm* — Wegman Hessler

(57) ABSTRACT

A multi-mode trimmer head for use with an outdoor handheld tool such as a string trimmer, brush cutter, or the like is provided. The trimmer head includes an upper housing, lower housing, bump head, spool, and a spring. The spool includes a first pair of apertures configured to receive a pair of flexible trimmer lines to provide a bump-feed operating mode for the trimmer head. The spool also includes a separate, second pair of apertures configured to receive a single fixed-line trimmer line to provide a fixed-line operating mode for the trimmer head. The trimmer head is switchable between the fixed-line operating mode and the bump-feed operating mode without the need to disassemble the trimmer head.

13 Claims, 31 Drawing Sheets

(56) References Cited

U.S. PATENT DOCUMENTS

| | | | | |
|---|---|---|---|---|
| 4,644,655 A * | 2/1987 | Bottamiller | A01D 34/416 | 30/347 |
| 4,685,279 A * | 8/1987 | Gullett | A01D 34/416 | 30/276 |
| 4,756,146 A * | 7/1988 | Rouse | A01D 34/4166 | 30/276 |
| 4,790,071 A | 12/1988 | Helmig et al. | | |
| 4,905,465 A * | 3/1990 | Jones | A01D 34/4168 | 30/276 |
| 5,048,278 A * | 9/1991 | Jones | A01D 34/4166 | 30/276 |
| 5,239,811 A | 8/1993 | Pierce | | |
| 5,293,692 A * | 3/1994 | Sugihara | A01D 34/4161 | 30/276 |
| 5,430,943 A | 7/1995 | Lee | | |
| 5,433,006 A * | 7/1995 | Taguchi | A01D 34/416 | 30/276 |
| 5,615,543 A * | 4/1997 | Caffey | A01D 34/4166 | 30/276 |
| 5,649,413 A | 7/1997 | Oostendorp | | |
| 5,765,287 A * | 6/1998 | Griffini | A01D 34/4163 | 242/125.1 |
| 5,768,867 A * | 6/1998 | Carlsen | A01D 34/416 | 30/276 |
| 5,806,192 A * | 9/1998 | Everts | A01D 34/4163 | 30/276 |
| 5,836,227 A * | 11/1998 | Dees, Jr. | A01D 34/416 | 30/276 |
| 5,852,876 A | 12/1998 | Wang | | |
| 5,862,598 A | 1/1999 | Lee | | |
| 5,979,064 A * | 11/1999 | Kitz | A01D 34/4165 | 30/276 |
| 6,035,618 A * | 3/2000 | Fogle | A01D 34/4166 | 30/276 |
| 6,108,914 A * | 8/2000 | Sheldon | A01D 34/4166 | 30/276 |
| 6,122,832 A | 9/2000 | Lee | | |
| 6,148,523 A * | 11/2000 | Everts | A01D 34/4163 | 30/276 |
| 6,240,643 B1 * | 6/2001 | Civalleri | A01D 34/4168 | 30/276 |
| 6,263,580 B1 * | 7/2001 | Stark | A01D 34/4163 | 30/276 |
| 6,442,845 B2 | 9/2002 | Wheeler et al. | | |
| 6,457,242 B1 * | 10/2002 | Fogle | A01D 34/4166 | 30/276 |
| 6,460,253 B1 | 10/2002 | Wheeler et al. | | |
| 6,842,984 B1 * | 1/2005 | Grant | A01D 34/4168 | 30/276 |
| 6,854,185 B1 * | 2/2005 | Alliss | A01D 34/4161 | 30/276 |
| 6,925,789 B2 * | 8/2005 | Lin | A01D 34/416 | 56/12.7 |
| 7,000,324 B2 * | 2/2006 | Fogle | A01D 34/416 | 30/276 |
| 7,059,106 B2 * | 6/2006 | Brandon | A01D 34/4166 | 30/276 |
| 7,412,768 B2 | 8/2008 | Alliss et al. | | |
| 7,665,215 B2 | 2/2010 | Fogle | | |
| 7,913,401 B2 | 3/2011 | Iacona | | |
| 8,001,694 B2 * | 8/2011 | Sing | A01D 34/4166 | 30/276 |
| 8,464,431 B2 | 6/2013 | Reynolds et al. | | |
| 8,769,831 B2 | 7/2014 | Duvall | | |
| 9,603,301 B2 * | 3/2017 | Jerez | A01D 34/416 | |
| 10,070,582 B2 * | 9/2018 | Nolin | A01D 34/4166 | |
| 2001/0003935 A1 * | 6/2001 | Morabit | A01D 34/4168 | 83/13 |
| 2002/0029483 A1 * | 3/2002 | Price | A01D 34/733 | 30/276 |
| 2002/0189107 A1 * | 12/2002 | Arnetoli | A01D 34/416 | 30/276 |
| 2004/0148784 A1 * | 8/2004 | Grace | A01D 34/4163 | 30/276 |
| 2005/0072007 A1 * | 4/2005 | Proulx | A01D 34/4163 | 30/276 |
| 2005/0252009 A1 | 11/2005 | Alliss | | |
| 2008/0052917 A1 * | 3/2008 | Proulx | A01D 34/416 | 30/276 |
| 2008/0053052 A1 * | 3/2008 | Cigarini | A01D 34/4163 | 56/12.7 |
| 2008/0163496 A1 | 7/2008 | Huseman | | |
| 2009/0031567 A1 * | 2/2009 | Fogle | A01D 34/416 | 30/276 |
| 2009/0172955 A1 * | 7/2009 | Morris | A01D 34/4163 | 30/276 |
| 2009/0260237 A1 * | 10/2009 | Alliss | A01D 34/4162 | 30/276 |
| 2010/0083506 A1 * | 4/2010 | Bennett | A01D 34/4168 | 30/122 |
| 2010/0101099 A1 * | 4/2010 | Morabit | A01D 34/416 | 30/347 |
| 2010/0154229 A1 * | 6/2010 | Iacona | A01D 34/4163 | 30/347 |
| 2011/0000091 A1 * | 1/2011 | Proulx | A01D 34/4165 | 30/276 |
| 2011/0119932 A1 * | 5/2011 | Pfaltzgraff | A01D 34/4165 | 30/347 |
| 2011/0214301 A1 * | 9/2011 | Proulx | A01D 34/416 | 30/347 |
| 2011/0225832 A1 * | 9/2011 | Alliss | A01D 34/4162 | 30/347 |
| 2011/0302793 A1 * | 12/2011 | Alliss | A01D 34/4165 | 30/347 |
| 2012/0000079 A1 * | 1/2012 | Arnetoli | A01D 34/4163 | 30/347 |
| 2012/0260508 A1 * | 10/2012 | Duvall | A01D 34/4166 | 30/347 |
| 2013/0205596 A1 | 8/2013 | Pellenc | | |
| 2014/0033546 A1 * | 2/2014 | Arnetoli | A01D 34/4166 | 30/347 |
| 2014/0150267 A1 | 6/2014 | Sowell et al. | | |
| 2015/0121707 A1 * | 5/2015 | Li | A01D 34/4161 | 30/276 |
| 2015/0150191 A1 * | 6/2015 | Alliss | A01D 34/4161 | 29/433 |
| 2015/0223395 A1 * | 8/2015 | Pellenc | A01D 34/4161 | 30/276 |
| 2016/0081268 A1 * | 3/2016 | Lang | A01D 34/4166 | 30/276 |
| 2016/0106034 A1 * | 4/2016 | Arnetoli | A01D 34/4166 | 30/276 |
| 2016/0128276 A1 * | 5/2016 | Arnetoli | A01D 34/4166 | 30/276 |
| 2017/0118911 A1 * | 5/2017 | Jerez | A01D 34/733 | |
| 2017/0347523 A1 * | 12/2017 | Alliss | A01D 34/4161 | |
| 2018/0020614 A1 * | 1/2018 | Alliss | A01D 34/4163 | 30/276 |
| 2018/0020615 A1 * | 1/2018 | Alliss | A01D 34/4163 | 30/276 |
| 2018/0177122 A1 * | 6/2018 | Skinner | A01D 34/4166 | |

* cited by examiner

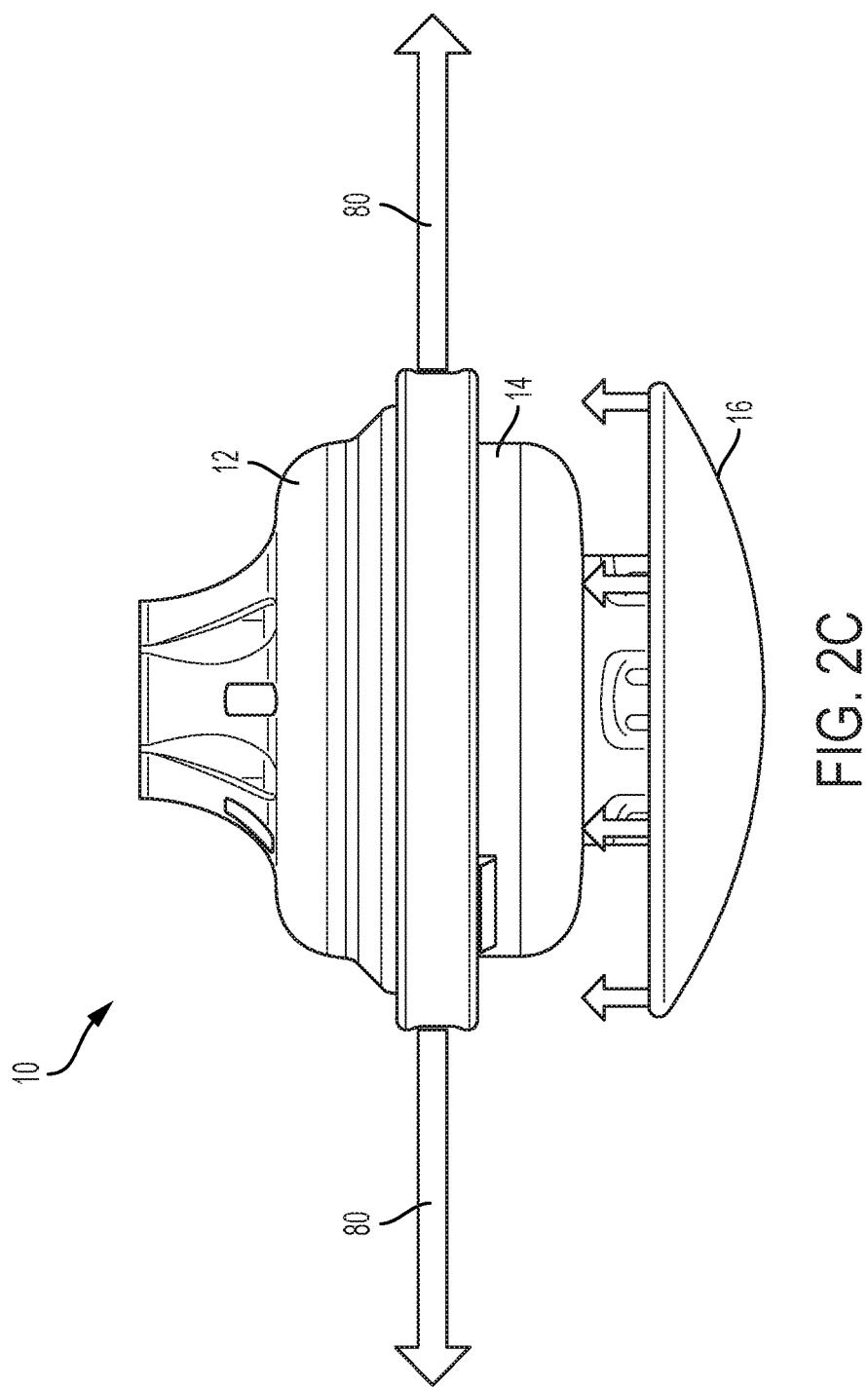

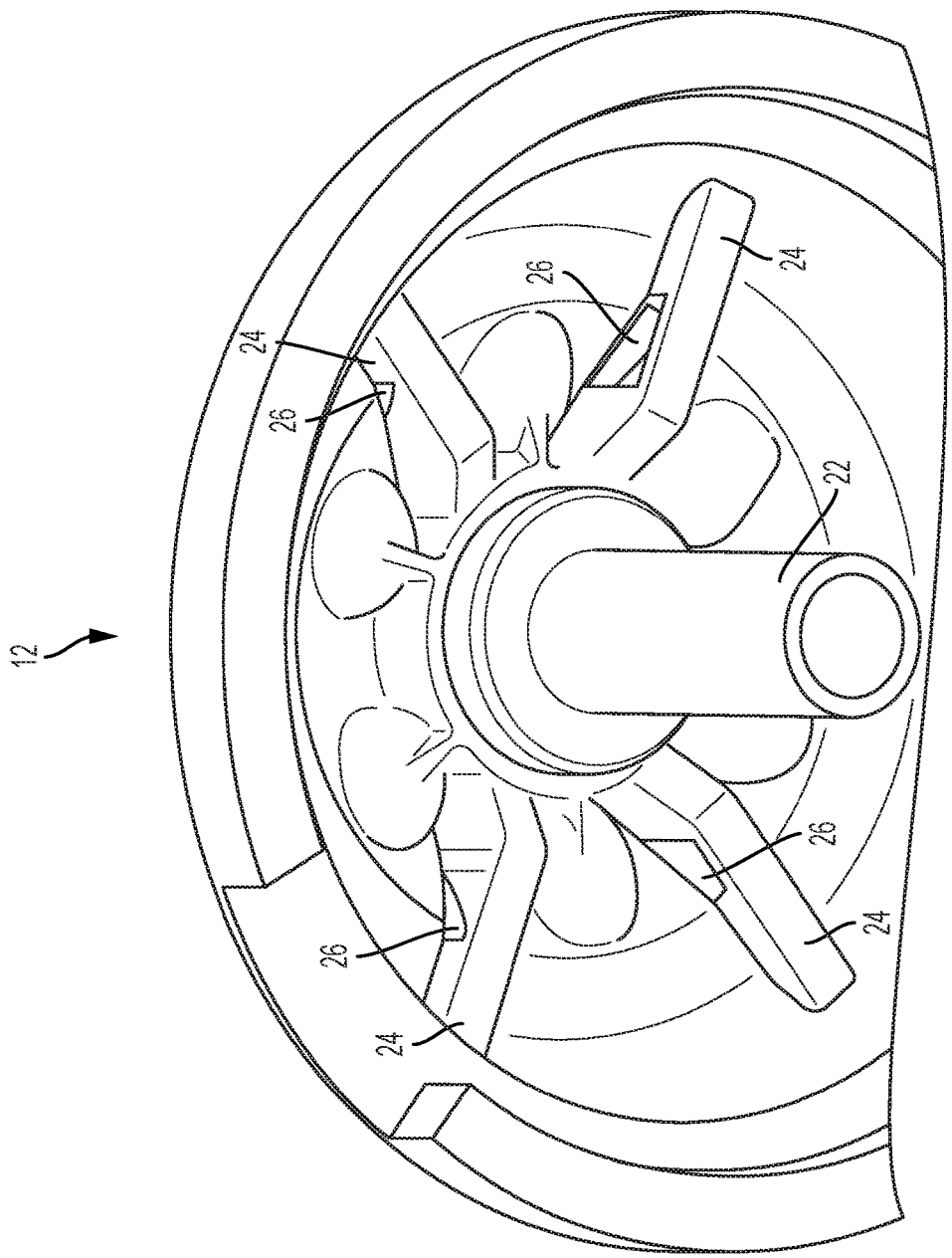

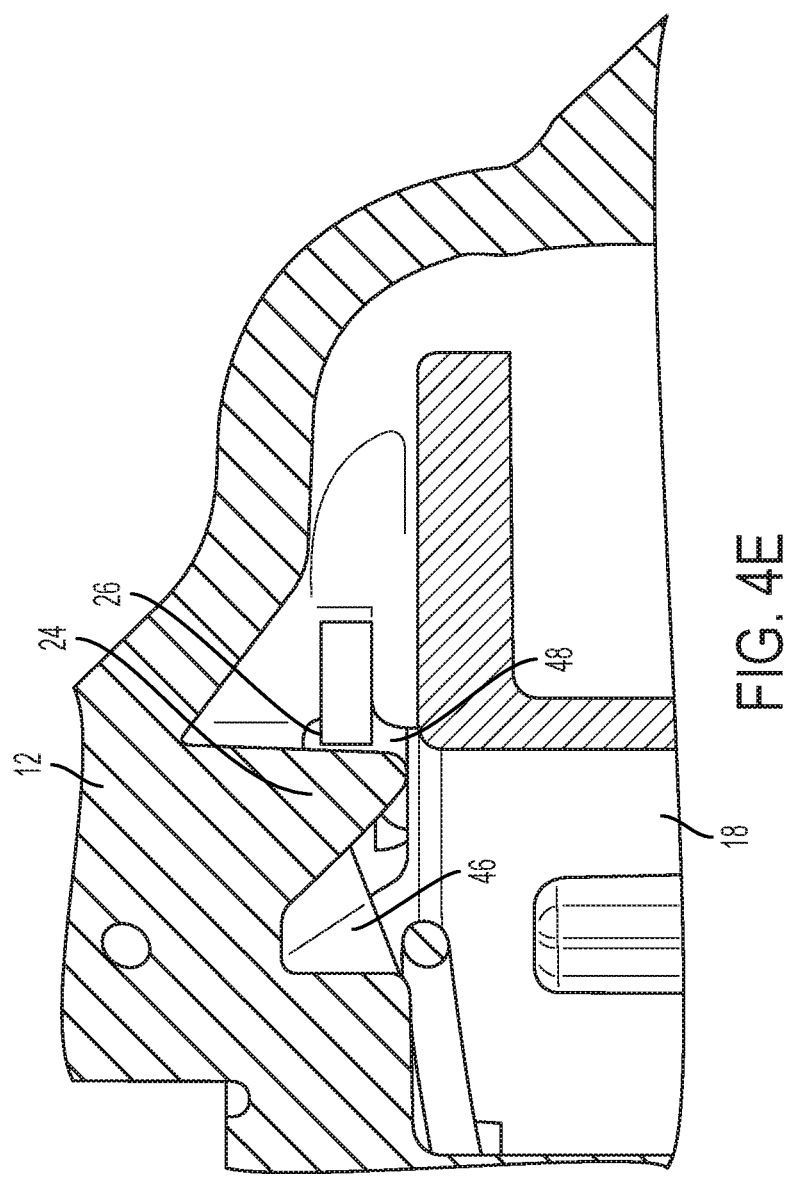

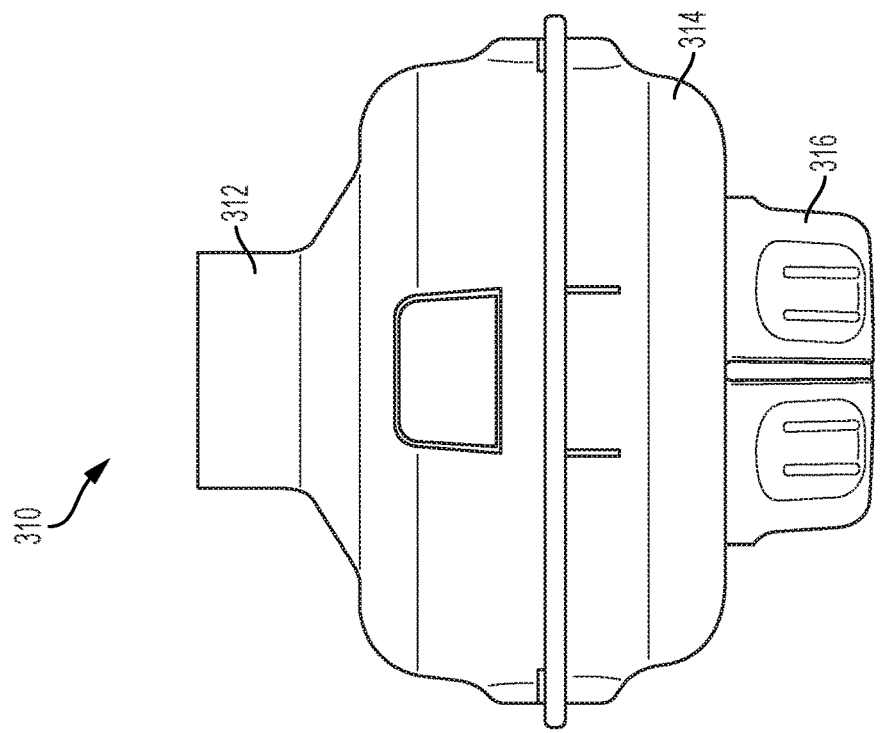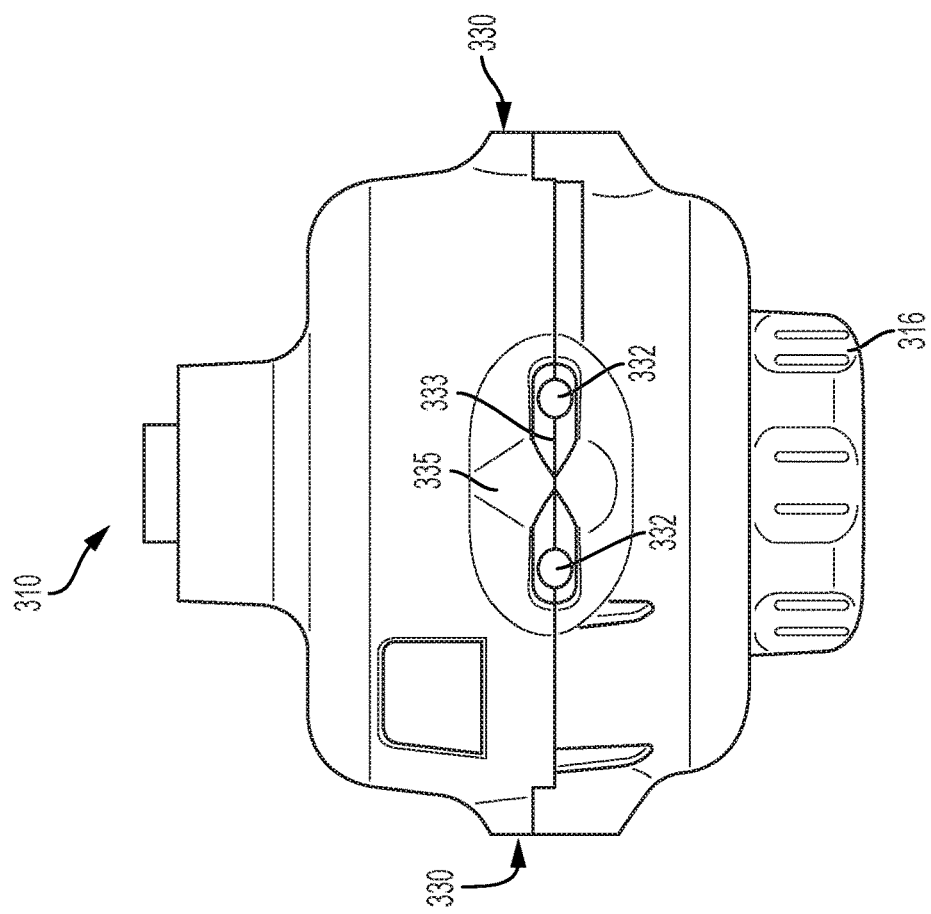

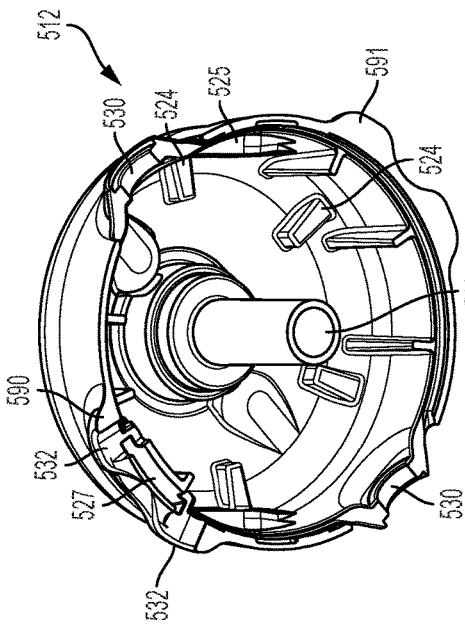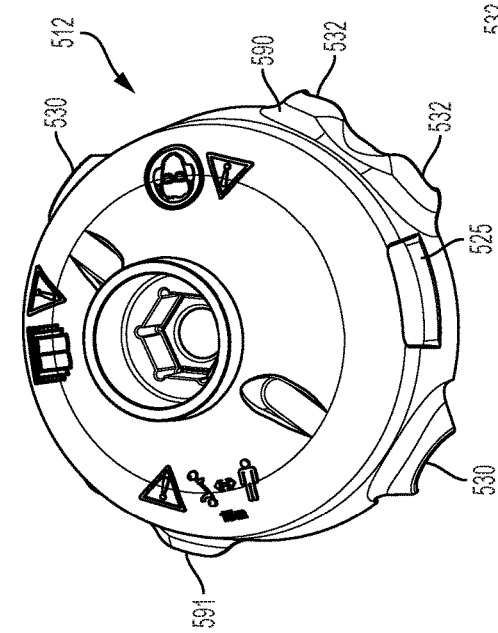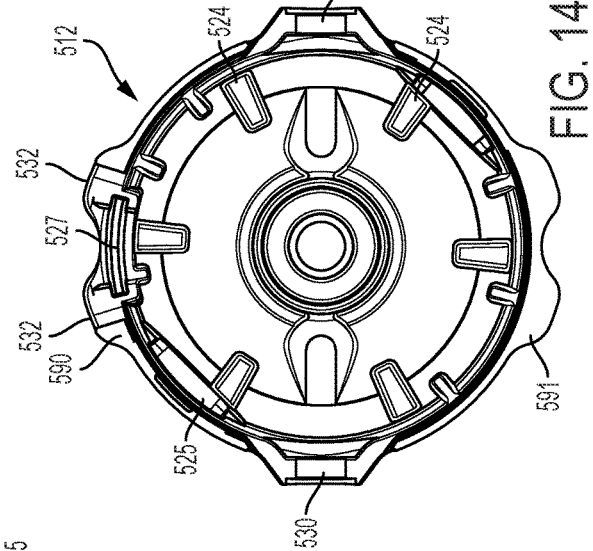

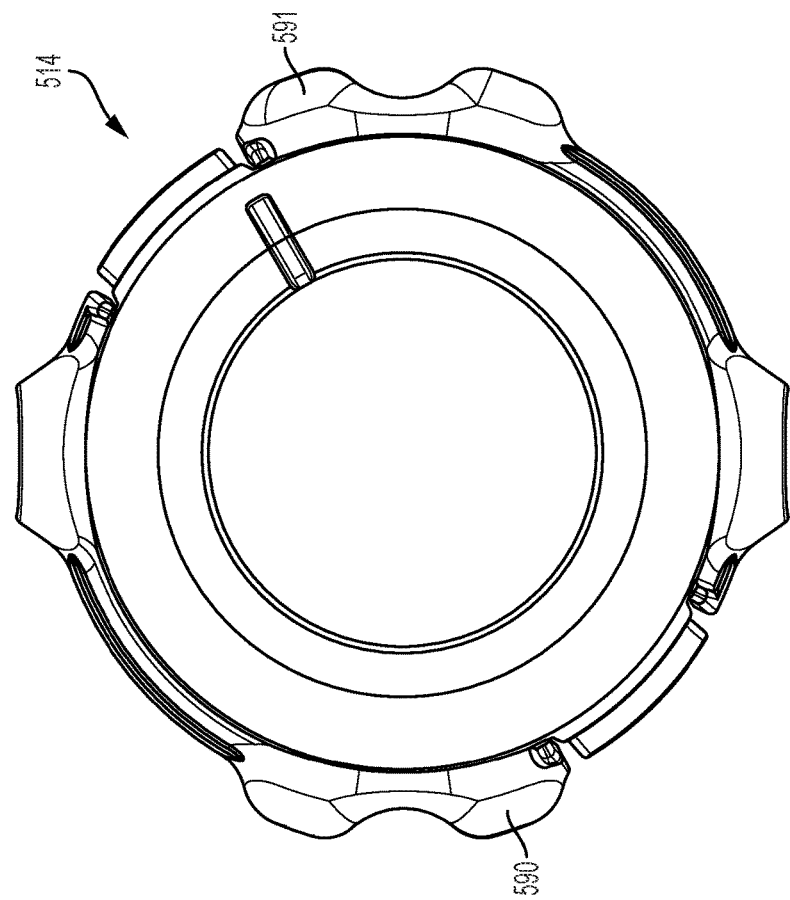
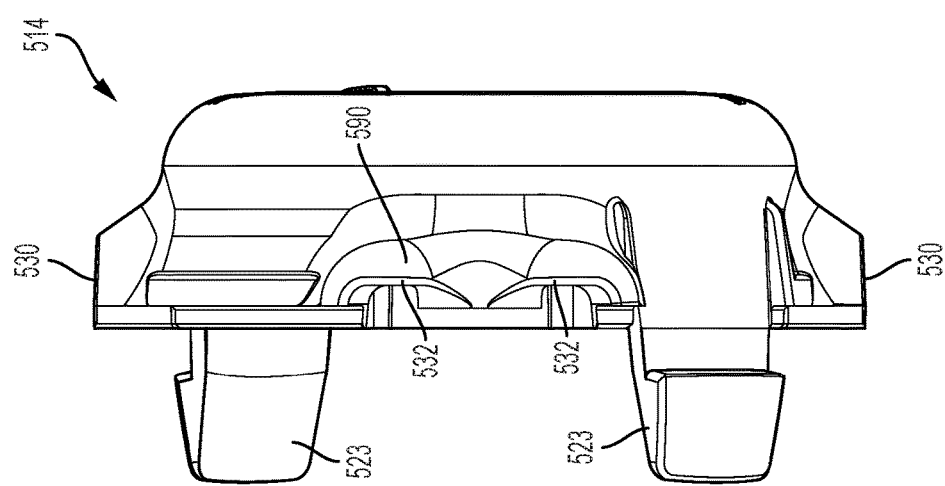
FIG. 15D
FIG. 15C

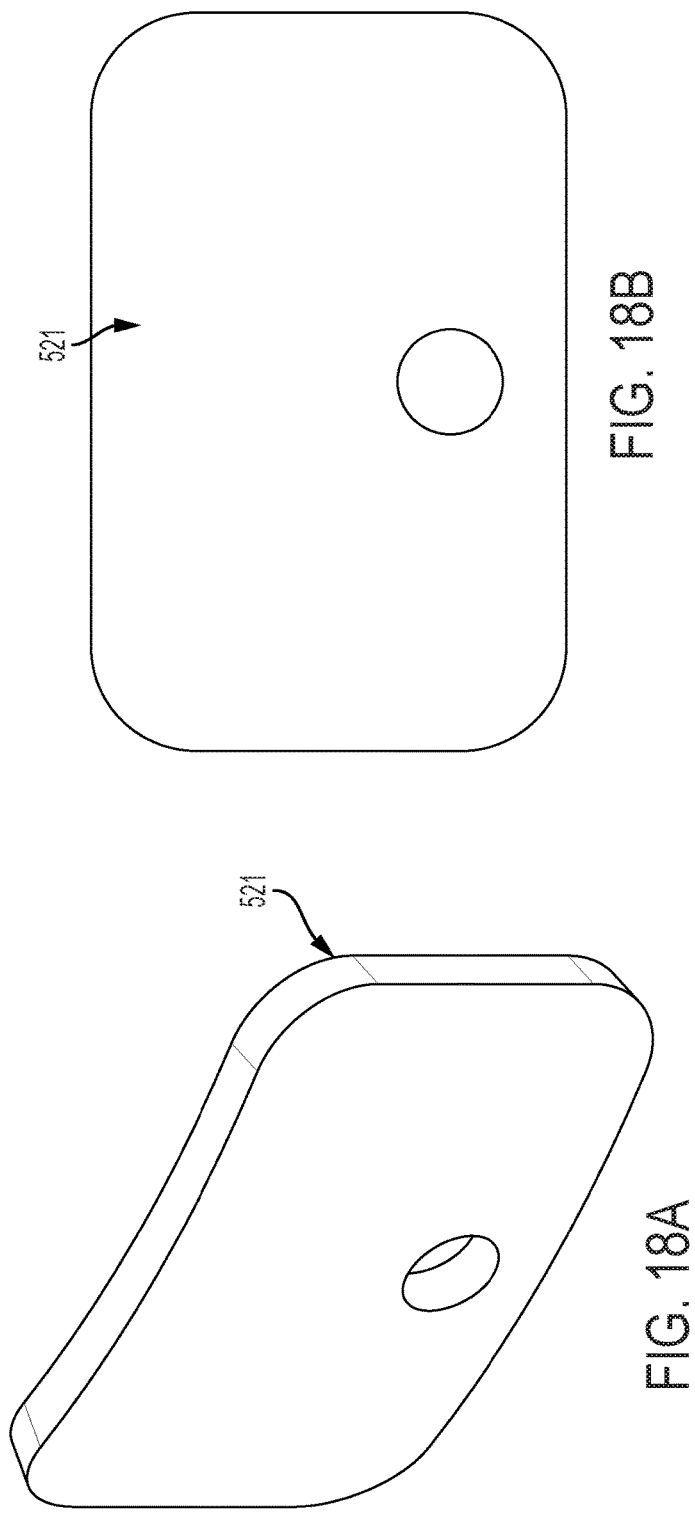
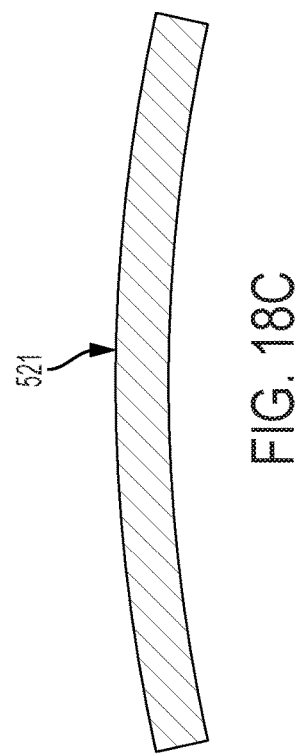
FIG. 18B
FIG. 18C
FIG. 18A

MULTI-MODE TRIMMER HEAD

CROSS-REFERENCE TO RELATED APPLICATIONS

The present application claims priority from U.S. Provisional Patent Application Ser. No. 62/298,177, filed on Feb. 22, 2016, and U.S. Provisional Patent Application Ser. No. 62/332,260, filed on May 5, 2016, both of which are hereby incorporated by reference herein in their entirety.

FIELD OF THE INVENTION

The present invention relates to outdoor handheld tools and, more particularly, to a trimmer head for a string trimmer or brush cutter.

BACKGROUND OF THE INVENTION

String trimmers and brush cutters are commonly used outdoor handheld tools used for lawn maintenance. String trimmers and brush cutters typically utilize a spinning trimmer head having trimmer line, blades, a combination thereof, or the like that extend from the trimmer head, wherein the trimmer head spins at a high rotational velocity in order to chop, trim, or otherwise cut vegetation.

Trimmer heads for string trimmers are typically formed as either a fixed-line trimmer head or a bump-head trimmer head, but continuous- or gravity-feed trimmer heads are also known in the art. The fixed-line trimmer heads include a thicker, more rigid trimmer line that extends from the trimmer head, wherein the thicker trimmer line is better able to withstand extended use before needing to be replaced. The bump-head trimmer heads include a thinner, more flexible trimmer line that extends from the trimmer head, wherein the flexible trimmer line often breaks easily so a larger supply of wound trimmer line is needed in order to supply additional trimmer line when the portion extending from the trimmer head breaks or needs replaced.

Trimmer heads are typically single-type, so a trimmer head is usually either solely a fixed-line trimmer head or solely a bump-head trimmer head. A need therefore exists for a multi-mode trimmer head that can provide a fixed-line operating mode as well as a bump-feed operating mode.

BRIEF SUMMARY OF THE INVENTION

In one aspect of the present invention, a multi-mode trimmer head for an outdoor handheld tool is provided. The trimmer head includes an upper housing having a bolt shaft that allows the trimmer head to be attachable to the outdoor handheld tool. The trimmer head also includes a lower housing operatively connected to the upper housing. A bump head is operatively connected to the lower housing, wherein the bump head extends from the lower housing. A spool is positioned between the upper and lower housings and attached to the bump head. The spool has a first set of apertures for receiving a flexible trimmer line in one mode and a separate second set of apertures for receiving a fixed-line trimmer line in a second mode.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 2C illustrates the bump head contacting the ground to feed a portion of the trimmer line outward;

FIG. 4A is a bottom view of an upper housing;

FIG. 4E illustrates the spool being interlocked with the upper housing during the fixed-line operating mode;

FIG. 8A is a first side view of the trimmer head shown in FIG. 6;

FIG. 8B is a second side view of the trimmer head shown in FIG. 6;

FIG. 14A is a top perspective view of an upper housing of the trimmer head shown in FIG. 12A;

FIG. 14B is a bottom perspective view of the upper housing shown in FIG. 14A;

FIG. 14C is a bottom view of the upper housing shown in FIG. 14A;

FIG. 15C is a side view of the lower housing shown in FIG. 15A;

FIG. 15D is a bottom view of the lower housing shown in FIG. 15A;

FIG. 18A is a top perspective view of a retainer;

FIG. 18B is a front view of the retainer shown in FIG. 18A; and

FIG. 18C is a cross-sectional view of the retainer shown in FIG. 18A.

Figure 1:
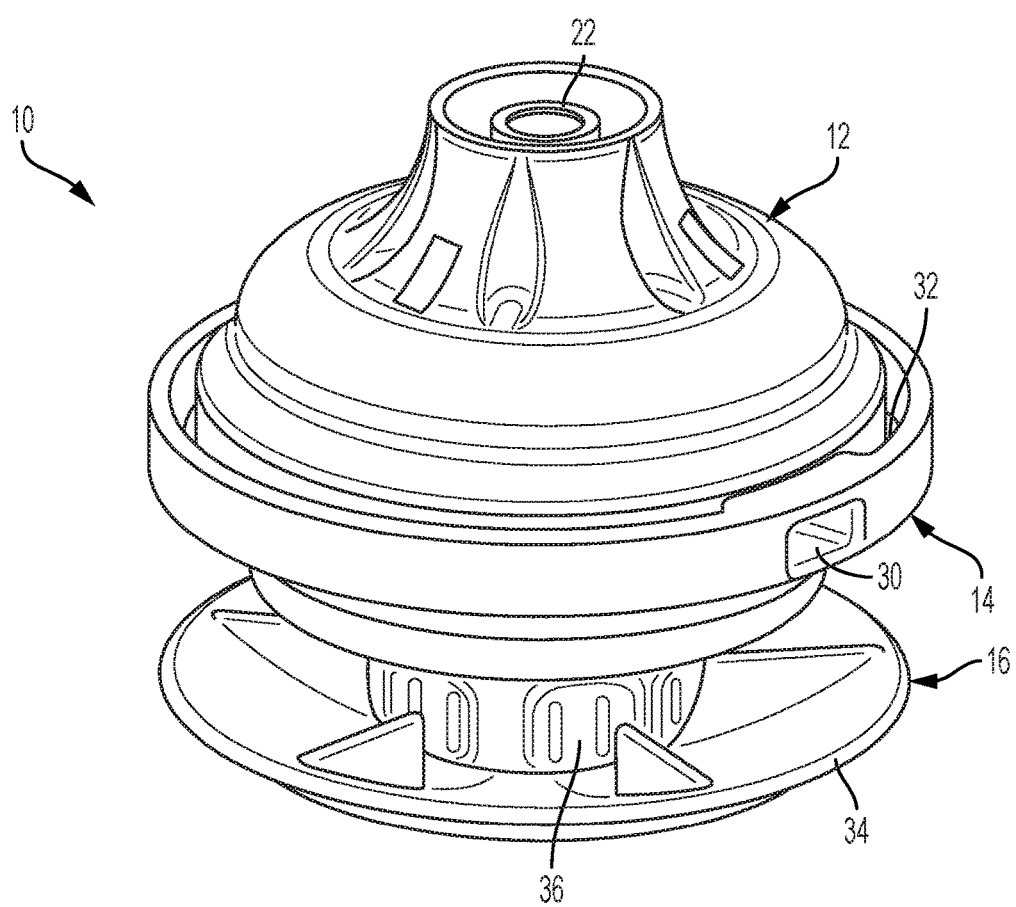
FIG. 1 is an exemplary embodiment of a multi-mode trimmer head.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 4B:
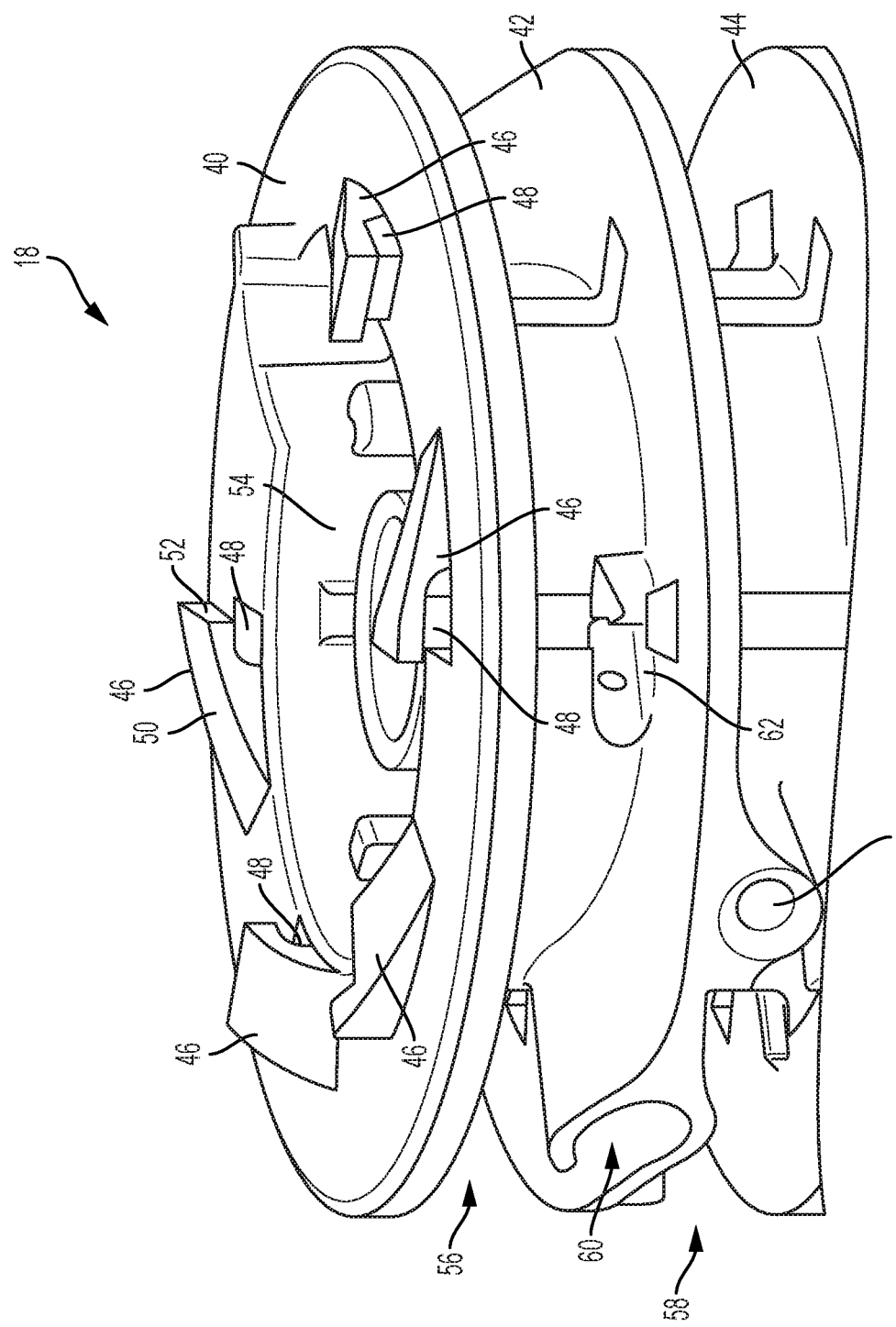
FIG. 4B is a top perspective view of a portion of a spool.
Figure 4C:
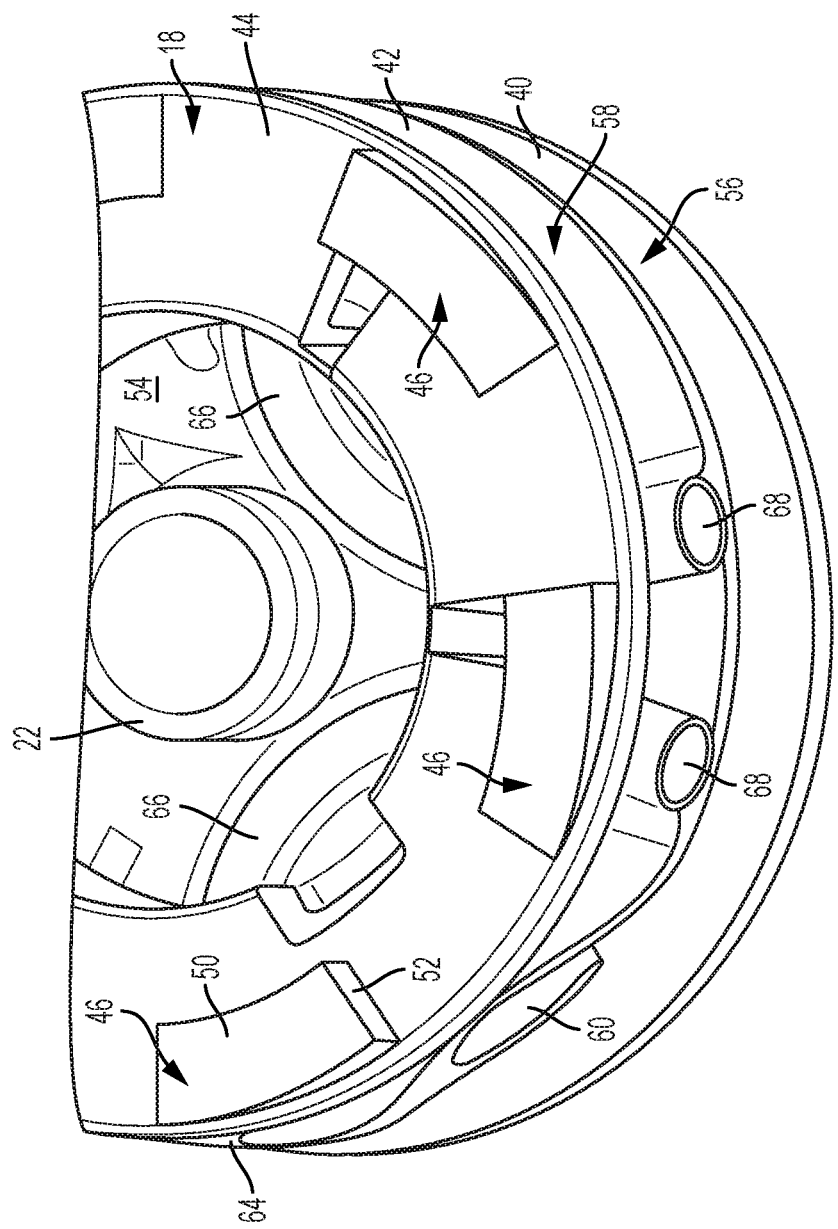
FIG. 4C is a bottom view of the spool shown in FIG. 4B.
Figure 4D:
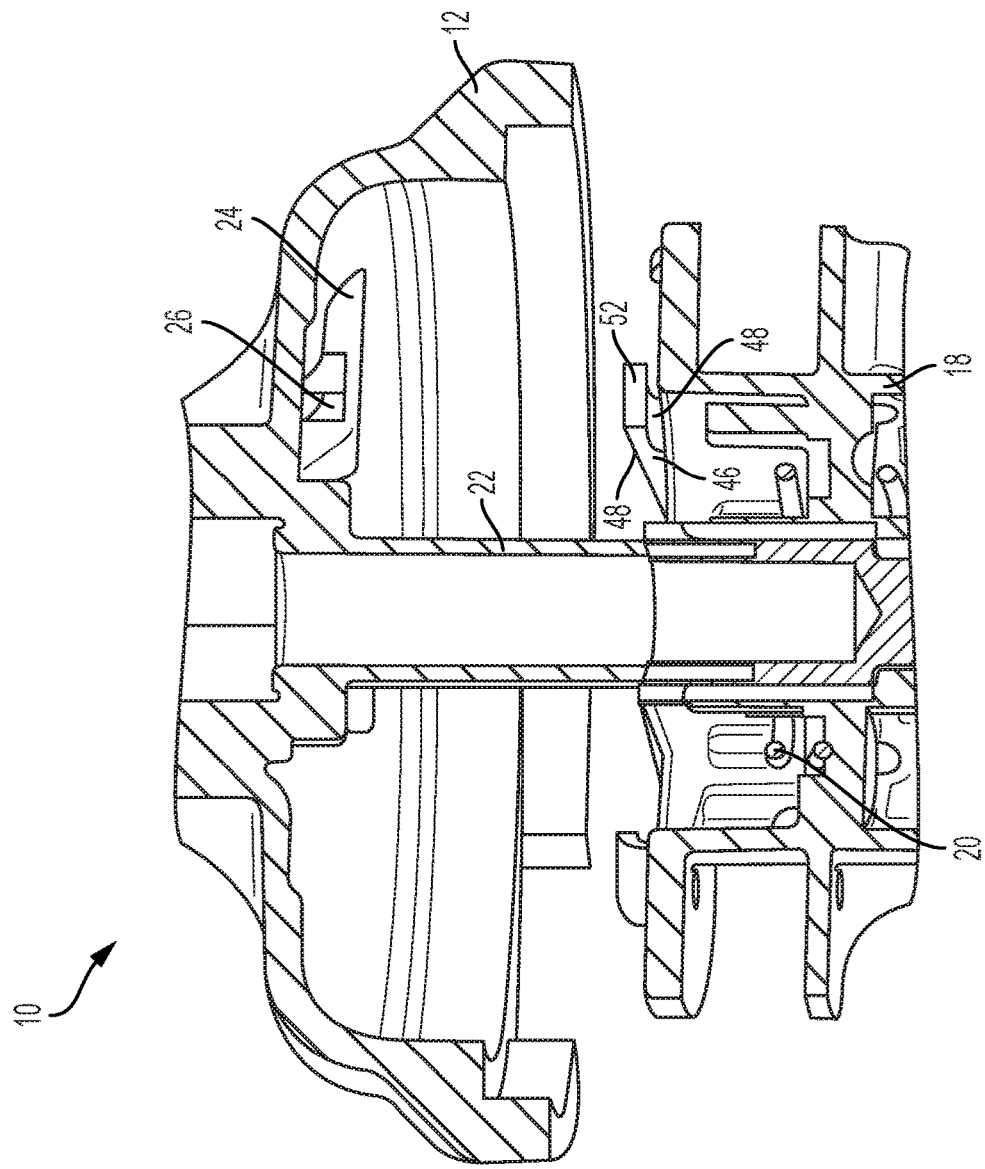
FIG. 4D is a cut-away and exploded view of the trimmer head shown in FIG. 1.

Referring to FIG. 1, an exemplary embodiment of a multi-mode trimmer head 10 for use with a string trimmer, a brush cutter, or other outdoor handheld tool is shown. The trimmer head 10 is configured to provide both a fixed-line operating mode as well as a bump-feed operating mode separately, thereby providing at least two different operating modes for the trimmer head 10. In another embodiment, the trimmer head 10 is also configured to be operable in a blade operating mode, wherein a plurality of cutting blades extend from the trimmer head 10. In a further embodiment, the trimmer head 10 is configured to include both a plurality of blades extending from the trimmer head as well as either the bump-feed operating mode or the fixed-line operating mode. The trimmer head 10 is configured to be operable in only one of the modes at a time or can be operable in a combination of modes simultaneously. It should be understood by one having ordinary skill in the art that operating the trimmer head 10 in the fixed-line operating mode first requires removal (and un-spooling) of the flexible trimmer line, if present, and operating the trimmer head 10 in the bump-feed operating mode first requires removal of the fixed-line trimmer line, if present. The trimmer head 10 is selectively switchable between the bump-feed operating mode and the fixed-line operating mode without having to disassemble the trimmer head 10 and without having to add or remove components therefrom. Both the bump-feed operating mode and the fixed-line operating mode can be combined with other operating modes. The trimmer head 10 includes an upper housing 12, a lower housing 14, a bump head 16, a spool 18 (FIGS. 4B-4C), and a spring 20 (FIG. 4D).

The upper housing 12 of the trimmer head 10, as shown in FIG. 1, is shaped as a generally inverted bowl. The upper housing 12 includes a bolt shaft 22 through which a female threaded adapter (not shown) operatively connects the upper housing 12 to the outdoor handheld tool (not shown). In an embodiment, the upper housing 12 is formed of a nylon material, but it should be understood by one having ordinary skill in the art that the upper housing 12 can be formed of metal, PVC, or other material (or combination of materials) sufficient to withstand the repeated impacts from rocks, dirt, vegetation, and the like while still providing a relatively lightweight component. The upper housing 12 is releasably connectable to the outdoor handheld tool for ease of removal and replacement, but the upper housing 12 is secured to the outdoor handheld tool which allows the trimmer head 10 to be rotated in order to cut vegetation. The upper housing 12 is releasably connectable to the lower housing 14 to form a generally hollow housing. As shown in FIG. 4A, the inner surface of the upper housing 12 includes a plurality of ribs 24 extending downwardly from the top surface. Each rib 24 includes an aperture 26 formed through the thickness thereof. In another embodiment, the apertures 26 are formed as detents that extend only partially through the thickness of the rib 24. The apertures 26 are configured to receive a portion of the spool 18 (FIGS. 4B-4C), as will be described below, to allow the spool to be rotationally locked with the upper housing 12.

Figure 5A:
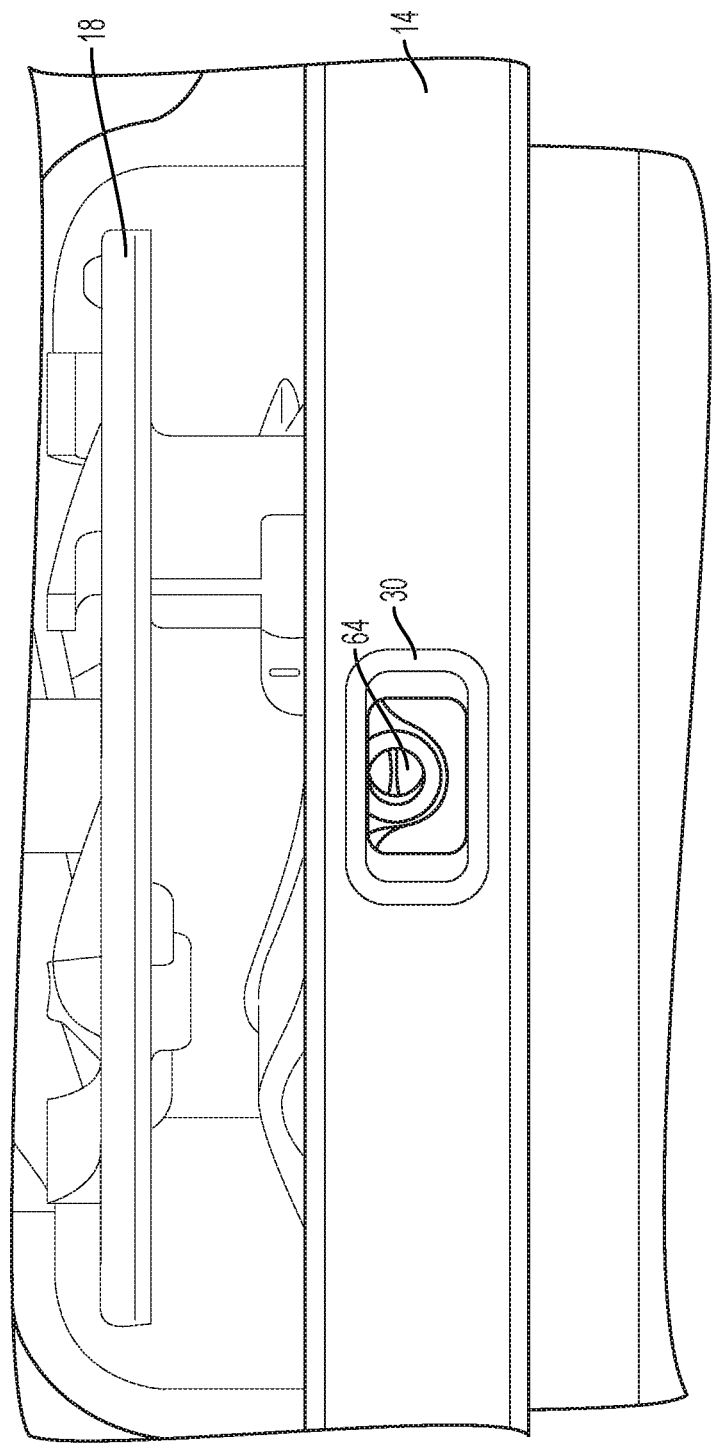
FIG. 5A illustrates the entrance aperture of the spool being aligned with a first aperture of the lower housing for insertion of fixed-line trimmer line during the fixed-line operating mode.
Figure 7:
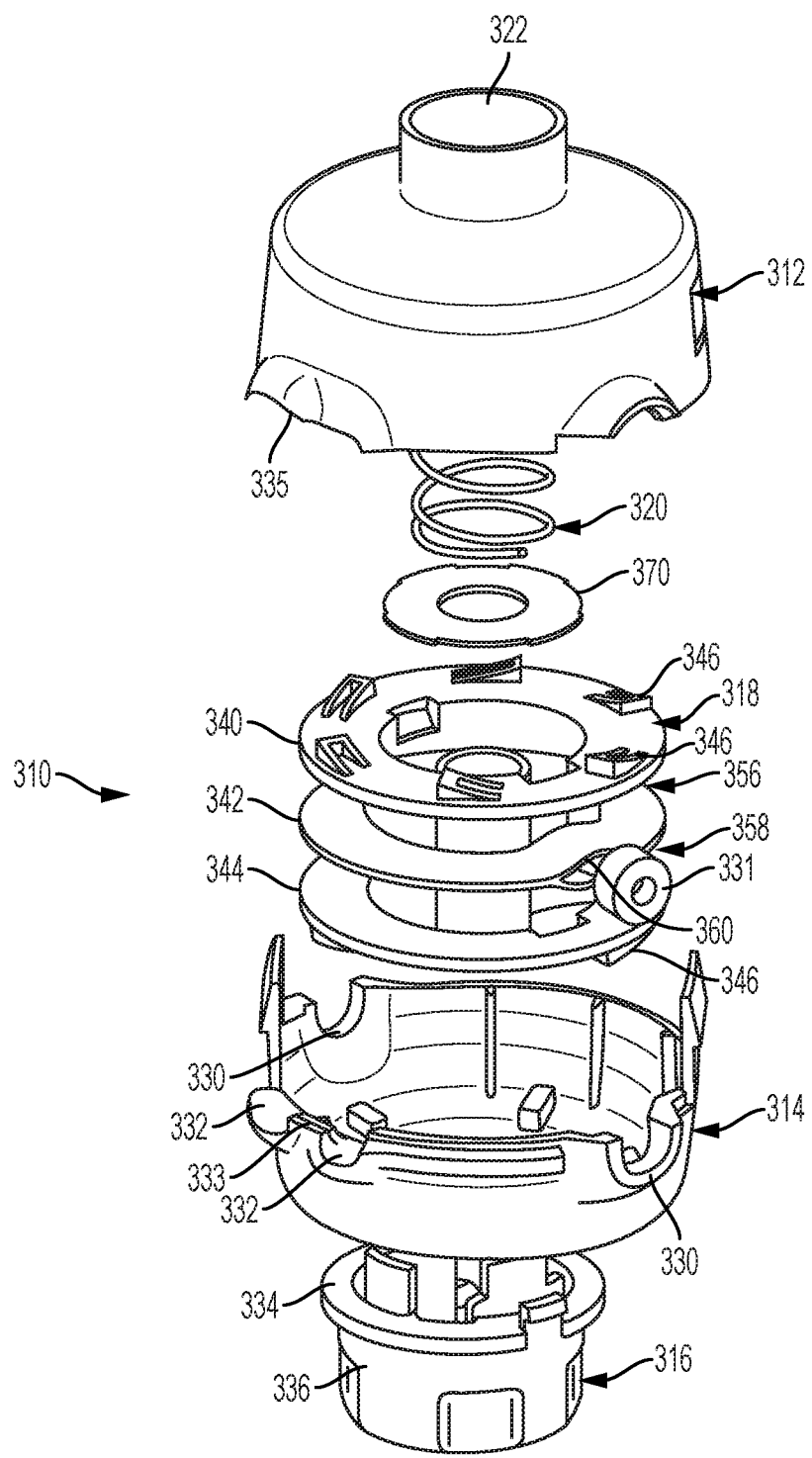
FIG. 7 is an exploded view of the trimmer head shown in FIG. 6.

The lower housing 14 of the trimmer head 10 is operatively connected to the upper housing, as shown in FIG. 1, wherein the lower housing 14 is releasably attachable to the upper housing 12. The lower housing 14 is generally formed as a bowl shape. In an embodiment, the lower housing 14 is formed of die cast metal, but it should be understood by one having ordinary skill in the art that the lower housing 14 can be formed of nylon, PVC, or other material sufficient to be durable and withstand the repeated impacts from rocks, dirt, vegetation, and the like while still providing a relatively lightweight component. The lower housing 14 includes a generally vertical side wall 28 that overlaps the upper housing 12 when attached thereto. The side wall 28 of the lower housing includes a plurality of apertures through which both the flexible string that is windable onto the spool 18 as well as the fixed-line trimmer line is inserted. In another embodiment, as shown in FIG. 7 below, the apertures through which both the flexible string and fixed-line trimmer line is inserted into the trimmer head 10 is partially defined at the intersection between the upper and lower housings 12, 14. The pair of first apertures 30 are formed through the side wall 28 of the lower housing 14 and positioned on opposing sides of the trimmer head 10. The first apertures 30 allow a length of trimmer line to be inserted therein from each of the opposing sides of the trimmer head 10 during a loading operation and removed therefrom during an unloading operation. The lower housing 14 further includes a pair of second apertures 32 formed adjacent to each other and generally located about circumferentially halfway between first apertures 30 along the side wall 28, as shown in FIG. 5C, for example. The second apertures 32 are configured to allow a piece of fixed-line trimmer line to be threaded therethrough during the loading and unloading operations of the fixed-line trimmer line.

The lower housing 14 includes a plurality of ribs (not shown) extending inwardly from the inner surface thereof. The ribs of the lower housing 14 are similar to the ribs of the upper housing 12, but without the aperture 26 formed therein. The ribs of the lower housing 14 are configured to engage ramps of the spool 18 to selectively prevent rotation of the spool relative to the lower housing 14 during operation of the trimmer head 10.

The bump head 16 is operatively connected to the lower housing 14, wherein the bump head 16 extends below the lower housing 14, as shown in FIG. 1. The bump head 16 includes a generally round disk 34 and a central member 36 extending from the round disk 34. The bump head 16 is selectively movable toward and away from the lower housing 14 as the operator taps the trimmer head 10 on the ground when used in the bump-feed operating mode. In another embodiment, the bump head 16 is formed as a knob, or a cup-like projection. It should be understood by one having ordinary skill in the art that the bump head 16 can be formed of any shape, provided that the bump head 16 extends downwardly away from the lower housing 14 to allow for the bump head 16 to contact the ground before the lower housing 14 during the bump-feed operating mode.

In an embodiment, the spool 18 includes an upper plate 40, a central plate 42, and a lower plate 44, wherein the plates are spaced-apart from each other, as shown in FIG. 4B. A plurality of ramps 46 extend upwardly from the upper surface of the upper plate 40. Each ramp 46 includes a slot 48 that is configured to cooperate with the apertures 26 formed in the ribs 24 of the upper housing 12, as shown in FIG. 4E. The ramps 46 are angled projections that are aligned in a generally circumferential manner adjacent to the outer radial edge of the upper plate 40. Each ramp 46 includes an angled surface 50 and a stop surface 52. The slot 48 of each ramp 46 is formed into the stop surface 52 where the stop surface 52 transitions to the upper plate 40. In other embodiments, the ramps 46 do not include a slot 48 such that the stop surface 52 extends fully to the upper surface of the upper plate 40. The ramps 46 are positioned about a central bore 54, which forms a recessed region in the center of spool 18. The engagement of the ramps 46 on the upper plate 40 and the ribs 24 of the upper housing 12 will be described in more detail below. Rotation of the spool 18 in response to sliding contact between the ribs 24 of the upper housing 12 and the angled surfaces 50 of the ramps 46 on the upper plate 40 of the spool 18 will be described in more detail below as well. As shown in FIG. 4C, a plurality of ramps 46 extend downwardly from the lower surface of the lower plate 44—similar to the ramps 46 formed on the upper plate 40, but without the slot 48. The ramps 46 are angled projections that are aligned in a generally circumferential manner adjacent to the outer radial edge of the lower plate 44. Each ramp 46 includes an angled surface 50 and a stop surface 52. The ramps 46 are positioned about a central bore 54, which forms a recessed region in the center of spool 18. The engagement of the ramps 46 on the lower plate 44 of the spool 18 and the ribs (not shown) of the lower housing 14 will be described in more detail below.

The spacing between the plates of the spool 18 provide an upper channel 56 and a lower channel 58, wherein the upper channel 56 is formed between the upper plate 40 and the central plate 42, and the lower channel 58 is formed between the central plate 42 and the lower plate 44, as shown in FIGS. 4B-4C. The upper and lower channels 56, 58 are configured to receive flexible trimmer line that is wound about the central bore 54 in a bump-feed operating mode.

The spool 18 includes a pair of cooperating apertures configured to receive and hold a piece flexible trimmer line in a bump-feed operating mode. The pair of cooperating apertures includes a winding aperture 60 and a holding aperture 62. As shown in FIGS. 4B-4C, the central plate 42 includes a pair of winding apertures 60 that extend from the outer radial edge to the wall defining the central bore 54. Each of the winding apertures 60 is configured to receive a portion of thin flexible trimmer line. Each of the outer openings of the winding apertures 60 is alignable with a corresponding first aperture 30 of the lower housing 14 in the bump-feed operating mode to allow flexible trimmer line to be inserted through both apertures 30, 60. The shape of the winding apertures 60 is configured such that once the flexible line is inserted through the winding aperture 60 and the spool 18 is rotated relative to the lower housing 14, the flexible line is wound about the central bore 54. Flexible line (not shown) inserted into one of the winding apertures 60 is windable into the upper channel 56, and flexible line (not shown) inserted into the other of the winding apertures 60 is windable into the lower channel 58, wherein the flexible line in each channel feeds a portion of the flexible line out of the corresponding winding aperture 60 in response to the bump head 16 being contacted with the ground in a line-feeding operation. A pair of holding apertures 62 are positioned within the upper channel 56, formed on the wall defining the central bore 54. The holding apertures 62 are connected to the winding aperture 60 by way of a channel or groove on the upper surface of the central plate 42 that extends into the central bore 54 such that when a length of flexible trimmer line is inserted into one of the winding aperture 60, the flexible trimmer line travels along the channel or groove within the central bore 54 until it exits through a corresponding holding aperture 62. The end of the length of flexible trimmer line that exits the holding aperture 62 is positioned within the upper channel 56. In an embodiment, a first cover plate (370, FIG. 7) is positioned within the central bore 54 adjacent to the upper surface of the central plate 42, wherein the grooves formed in the upper surface of the central plate 42 within the central bore 54 cooperate with the first cover plate to form fully enclosed channels that extend between the winding and holding apertures 60, 62. The holding aperture 62 is configured to hold, or otherwise secure the distal end of the flexible trimmer line while the flexible trimmer line is wound into the upper or lower channel 56, 58.

The spool 18 further includes another set of apertures for receiving a fixed-line trimmer line in a fixed-line operating mode. The apertures configured to receive and secure the fixed-line trimmer line within the spool 18 includes a pair of entrance apertures 64 and a pair exit apertures 68. As shown in FIG. 4B, the central plate 42 of the spool 18 further includes a first pair of entrance apertures 64 (only one is shown in FIG. 4B—the other is positioned on the opposing side of the spool 18), wherein the entrance apertures 64 are positioned on the lower surface of the central plate 42 such that the entrance apertures 64 are located generally within the lower channel 58. The entrance apertures 64 are positioned on opposite sides of the spool 18, and oriented at about thirty degrees (30°) in the counter-clockwise direction from the winding apertures 60 (when viewed from the top of the spool 18). The entrance apertures 64 are alignable with the first apertures 30 of the lower housing 14 when the spool 18 is locked with the upper housing 12, as shown in FIG. 5D for loading a fixed-line trimmer line and described in more detail below. The entrance apertures 64 extend from the outer edge of the central plate 42 to the central bore 54.

Each of the entrance apertures 64 is operatively connected to a separate guide groove 66 formed into the lower surface of the central plate 42, as shown in the bottom view of the spool 18 in FIG. 4C. The guide grooves 66 extend within the central bore 54 between an entrance aperture 64 and an exit aperture 68. The guide grooves 66 are curved. In an embodiment, and the guide grooves 66 cooperate with a second cover plate (not shown) positioned adjacent to the lower surface of the central plate 42 within the central bore 54 to form a fully enclosed channel that extends between the entrance and exit apertures 64, 68.

As shown in FIG. 4C, the exit apertures 68 are formed as part of the central plate 42 of the spool 18. Like the entrance apertures 64, the exit apertures 68 extend from the outer edge of the central plate 42 to the central bore 54, where the exit apertures 68 are connected to a corresponding guide groove 66. The exit apertures 68 are positioned adjacent to each other on the central plate 42, and are space apart from each other to allow a fixed-line trimmer line form a loop as it exits one of the exit apertures 68 and enters the other during a loading operation in the fixed-line operating mode of the trimmer head 10. As shown in FIGS. 5B-5E, the exit apertures 68 of the spool 18 are alignable with the second apertures 32 in the side wall 28 of the lower housing 14.

The spool 18 includes a first set of apertures—the winding apertures 60 and the holding apertures 62—configured to receive a pair of flexible trimmer lines 80 to provide a bump-feed operating mode for the trimmer head 10. The spool 18 also includes a separate, second set of apertures—the entrance apertures 64 and the exit apertures 68, in conjunction with corresponding guide grooves 66 that extend therebetween—configured to receive a single fixed-line trimmer line 82 to provide a fixed-line operating mode for the trimmer head 10. The trimmer head 10 is switchable between the bump-feed operating mode and the fixed-line operating mode (and vice-versa) without needing to disassemble the trimmer head 10 in order to re-position the spool 18 therewithin to switch between operative modes. The trimmer head 10 also does not need to be disassemble (and subsequently re-assembled) in order to add/remove additional components to switch between modes. The trimmer head 10 is configured to be selectively switchable between the bump-feed operating mode and the fixed-line operating mode by locking/unlocking the spool 18 with the upper housing 12 (after removing any remaining trimmer line from the previous mode).

The bump head 16 is operatively connected to the spool 18 such that these components rotate together. In an embodiment, the bump head 16 and spool 18 include an interlocking mechanism (not shown) for attaching the bump head 16 directly to the spool 18 to form a unitary piece upon assembly. In another embodiment, the bump head 16 is separate from the spool 18 and is only in selective contact engagement therewith.

In an embodiment, the spring 20 is positioned within the central bore 54 of the spool 18, positioned adjacent to the upper surface of the central plate 42 and surrounding the bolt shaft 22 of the spool 18. The spring 20 is located between the upper surface of the central plate 42 and the inner surface of the upper housing 12 so as to bias the spool 18 downward toward the lower housing 14. In an embodiment, as the spring biases the spool 18 toward the lower housing 14, the ramps 46 of the lower plate 44 of the spool 18 engage the ribs (not shown) of the lower housing 14.

Figure 2A:
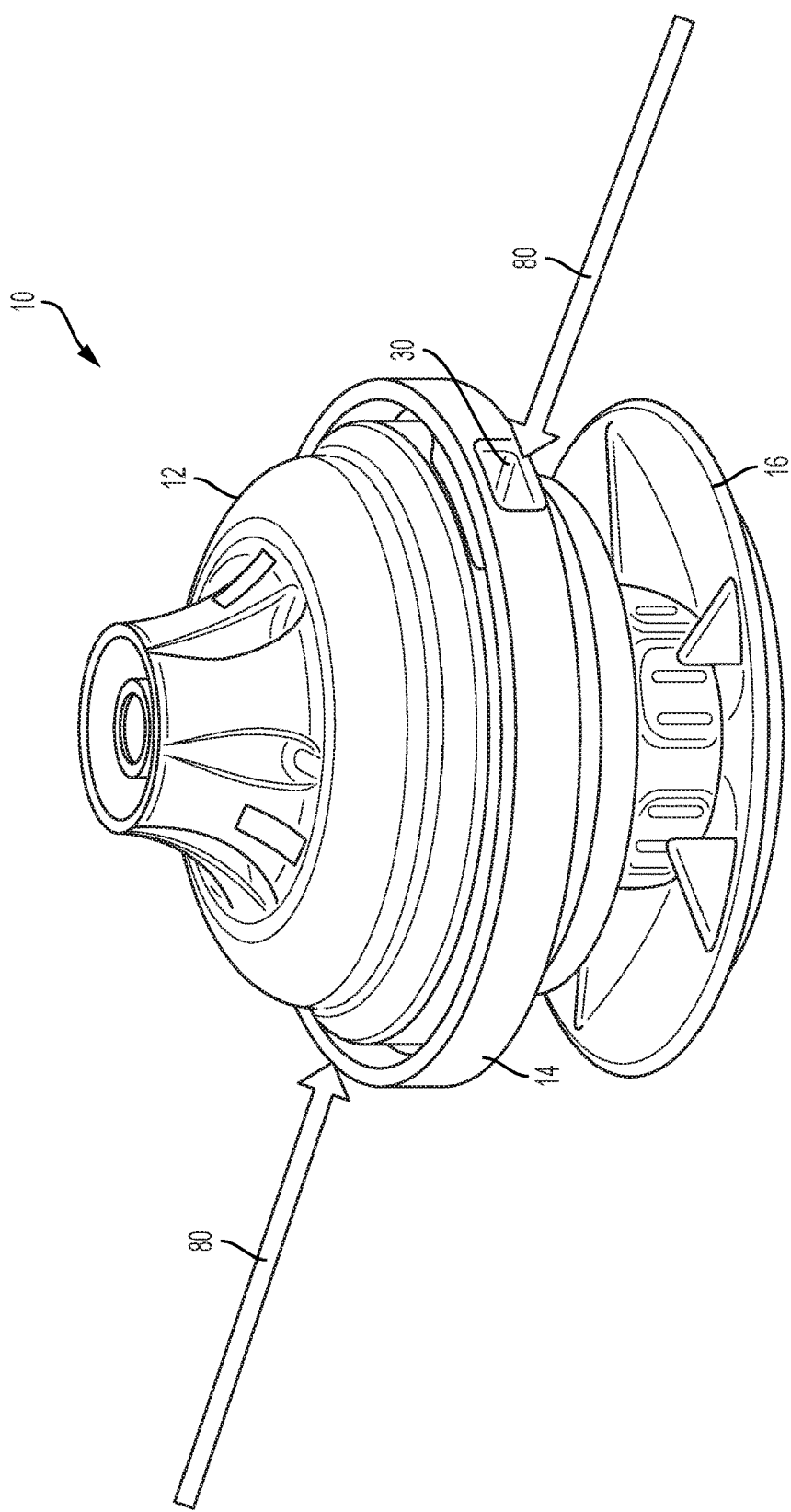
FIG. 2A illustrates a pair of flexible trimmer lines being inserted into the trimmer head shown in FIG. 1 during a bump-feed operating mode.

The trimmer head 10 is a multi-mode trimmer head, wherein the trimmer head 10 is selectively switchable between a fixed-line operating mode and a bump-feed operating mode. It should be understood by one having ordinary skill in the art that the multi-mode trimmer head 10 can also include a cutting blade mode or other combination of modes that are not shown. For the bump-feed operating mode, the spring 20 biases the spool 18 toward the lower housing 14 such that the stop surface 52 of at least one ramp 46 that extends downwardly from the lower plate 44 of the spool 18 engages one of the ribs (not shown) extending upwardly from the inner surface of the lower housing 14. In an embodiment, the bump head 16 is rotated such that the ramp(s) 46 are rotated in a direction away from the ribs of the lower housing 14 until the winding apertures 60 of the spool 18 are aligned with the first apertures 30 of the lower housing 14. Once the winding apertures 60 are aligned with the first apertures 30, a separate piece of flexible trimmer line 80 is inserted into each of the opposing first apertures 30, as shown in FIG. 2A. As the flexible trimmer line 80 is inserted into the first aperture 30, the trimmer line enters the winding aperture 60 of the spool 18 and is guided such that the distal end of the flexible trimmer line 80 exits the corresponding holding aperture 62, thereby securing the flexible trimmer line 80 within the spool 18.

Figure 2B:
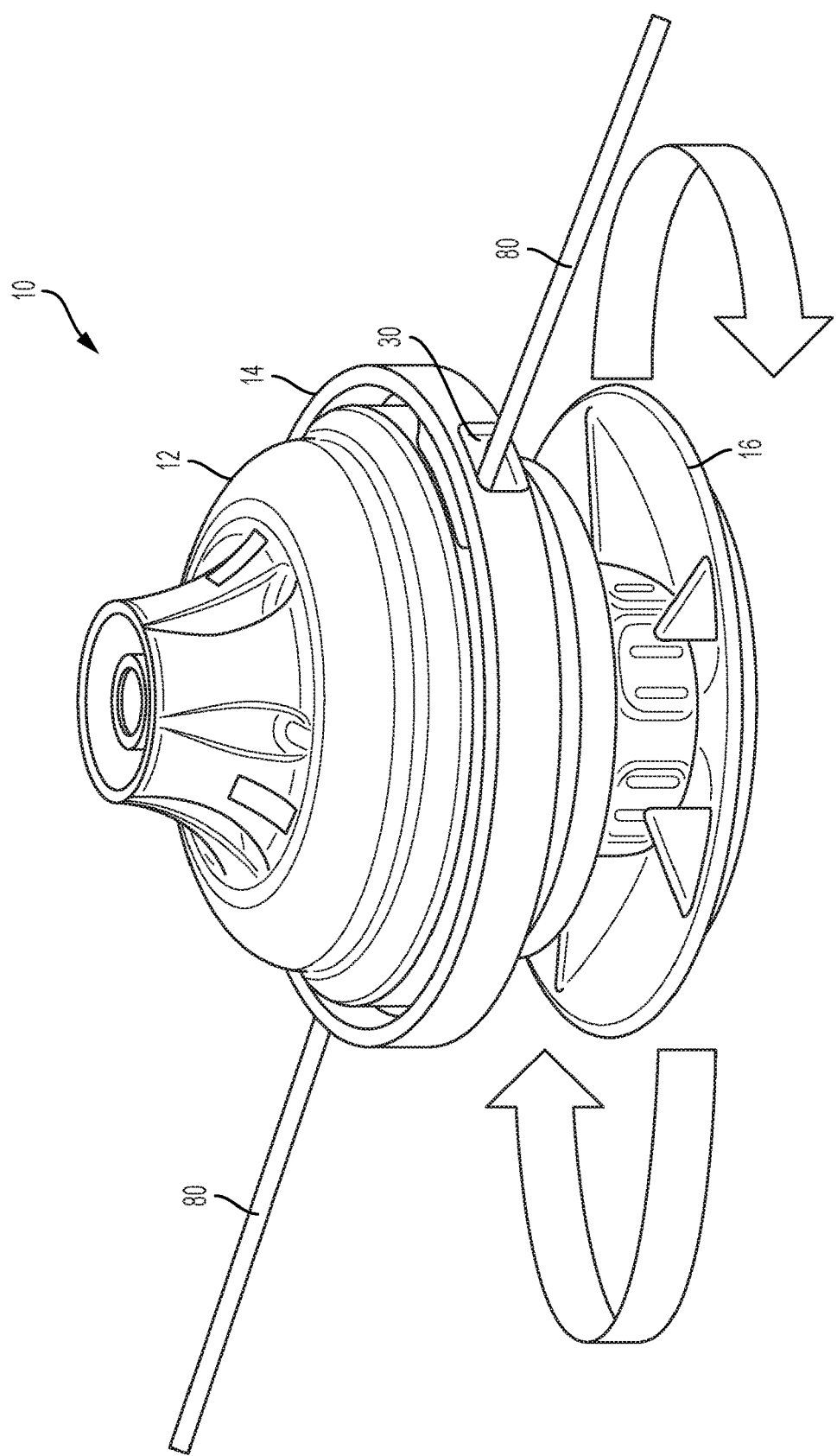
FIG. 2B illustrates the bump head of the trimmer head being rotated to wind the trimmer line onto a spool.

As shown in FIG. 2B, the bump head 16 is rotated, which causes the spool 18 to rotate. As the spool 18 rotates within the housing, the pair of flexible trimmer lines 80 are wound onto the spool 18 and into the upper and lower channels 56, 58. As the bump head 16 is rotated further, the angled surfaces 50 of the ramps 46 on the lower plate 44 of the spool 18 slide along the ribs of the lower housing 14, which causes slight movement of the spool 18 along the axis of the bolt shaft 22. This movement compresses the spring 20 such that when the spool 18 rotates such that the ribs of the lower housing 14 pass beyond the stop surfaces of the ramps, the spring 20 biases the spool 18 back toward the lower housing 14.

As shown in FIG. 2C, as the trimmer head 10 is pushed toward the ground, the bump head 16 contacts the ground which forces the bump head 16 toward the lower housing 14 and against the bias of the spring 20. As the bump head 16 moves toward the lower housing 14, the bump head 16 simultaneously pushes the spool 18 in the same direction. As the spool 18 moves toward the upper housing 12, the stop surfaces 52 of the ramps 46 on the lower plate 44 disengage from the ribs of the lower housing 14. Once the spool 18 is disengaged from the lower housing 14, the spool 18 rotates slower than the lower housing 14 such that the ribs of the lower housing 14 move past the stop surfaces 52 and over the angled surfaces 50. The angled surfaces 50 of the ramps 46 on the upper plate 40 of the spool 18 are aligned with the ribs 24. As such, as the spool 18 is moved axially toward the upper housing 12, the ribs 24 contact the angled surfaces 50 which cause the ribs 24 to slide down the angled surfaces 50, thereby causing initial rotation of the spool 18 relative to the upper housing. Simultaneously, centrifugal forces of the flexible trimmer line 80 causes the spool 18 to continue to rotate relative to the lower housing 14, wherein such relative rotation results in additional flexible trimmer line 80 is fed out the first apertures 30 to increase the length of trimmer line extending from the trimmer head 10. As the trimmer head 10 is moved away from the ground, the spring 20 biases the spool 18 toward the lower housing 14 such that the stop surface(s) 52 of the ramp(s) 46 engage the ribs of the lower housing 14 to prevent additional length of flexible trimmer line 80 from being fed out.

Figure 3A:
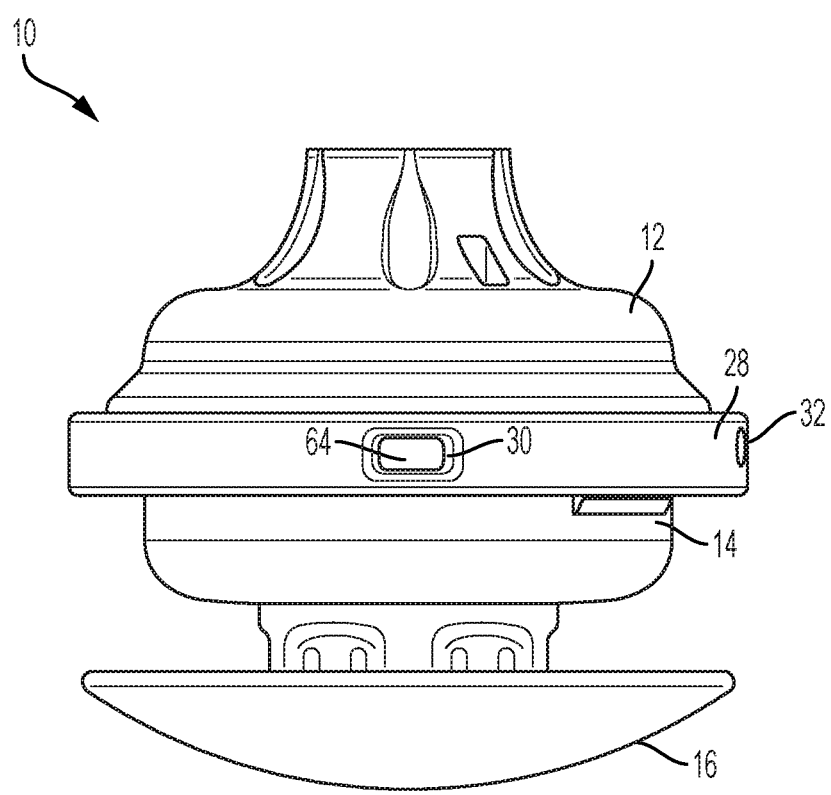
FIG. 3A illustrates the trimmer head shown in FIG. 1 in which an entrance aperture of the spool is aligned with a first aperture of the lower housing.
Figure 3B:
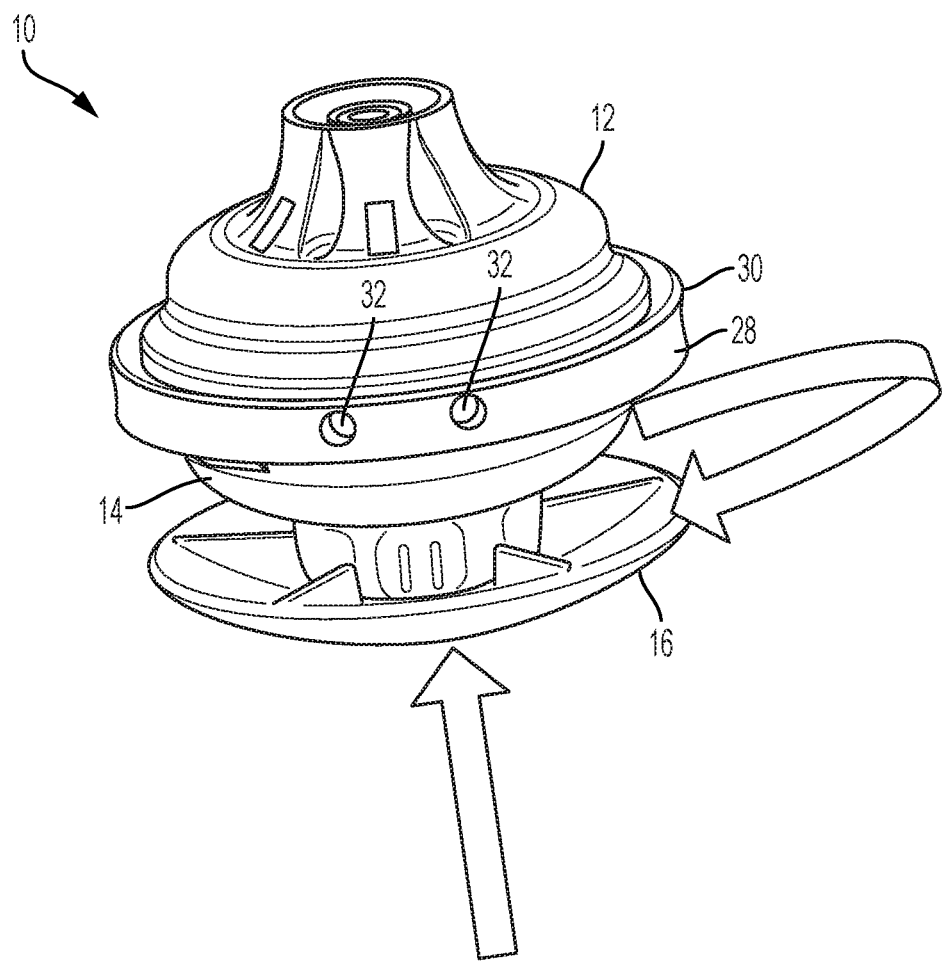
FIG. 3B illustrates the bump head being pushed and rotated during a fixed-line operating mode.

For the fixed-line operating mode of the trimmer head 10—understanding that all pieces of flexible trimmer line 80 have been removed from the trimmer head 10—the user grasps and rotates the bump head 16 until the winding apertures 60 of the spool 18 are aligned with the first apertures 30 of the lower housing 14 (which is the same alignment for insertion of flexible trimmer line in a bump-feed operating mode), as shown in FIG. 3A. When the winding apertures 60 of the spool 18 are aligned with the first apertures 30 of the lower housing 14, neither the entrance apertures 64 nor the exit apertures 68 of the spool 18 are aligned with the corresponding first or second apertures 30, 32, respectively, of the lower housing 14. After aligning the winding apertures 60 of the spool 18 with the first apertures 60 of the lower housing 14, the operator pushes upwardly on the bump head 16 toward the lower housing 14, as shown in FIG. 3B, and twists the bump head 16 in a first direction. This pushing movement of the bump head 16 causes the compression of the spring 20 and the spool 18 to move toward the upper housing 12. Once the spool 18 contacts the upper housing 12 (or other contact that limits the axial travel of the spool 18), the twisting movement of the bump head 16 and spool 18 causes the slot 48 of the ramps 46 located on the upper plate 40 of the spool 18 to receive the portion of the ribs 24 below the aperture 26, as shown in FIGS. 4D-4E. This engagement between the spool 18 and the upper housing 12 locks the spool 18 and the upper housing 14 together such that the spool 18 is unable to move in the first direction relative to the upper housing 12. It should be understood by one having ordinary skill in the art that rotating the bump head 16 (and thus, the spool 18) in a second direction, which is the rotational opposite of the first direction, causes the spool 18 to become unlocked from the upper housing 12. After locking the spool 18 and the upper housing 12, the entrance apertures 64 of the spool 18 become aligned with the first apertures 30 of the lower housing 14 and the exit apertures 68 of the spool 18 become aligned with the second apertures 32 of the lower housing 14, as shown in FIG. 5A.

Figure 5B:
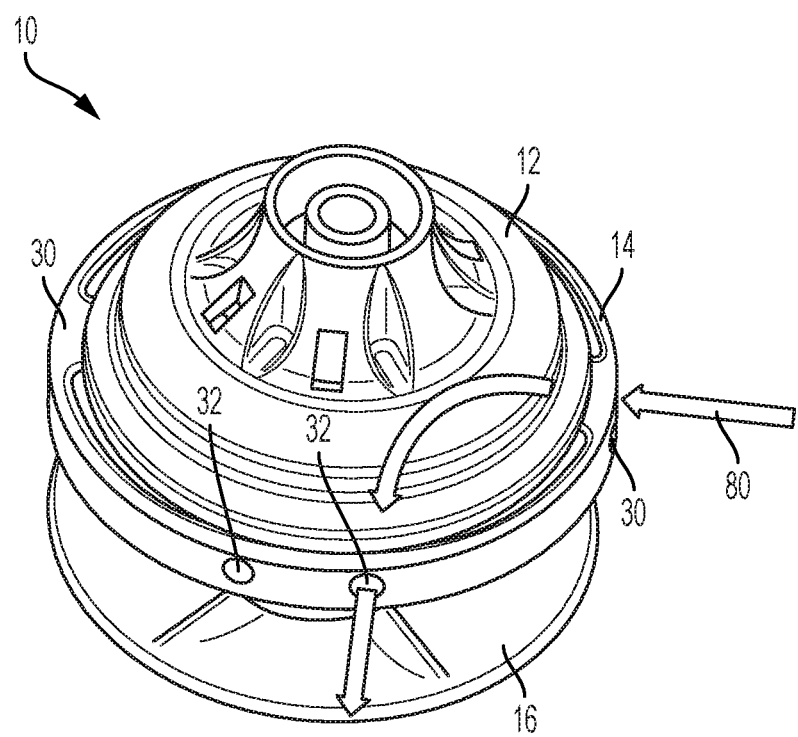
FIG. 5B illustrates a portion of the fixed-line trimmer line being fed through the trimmer head during the fixed-line operating mode.
Figure 5C:
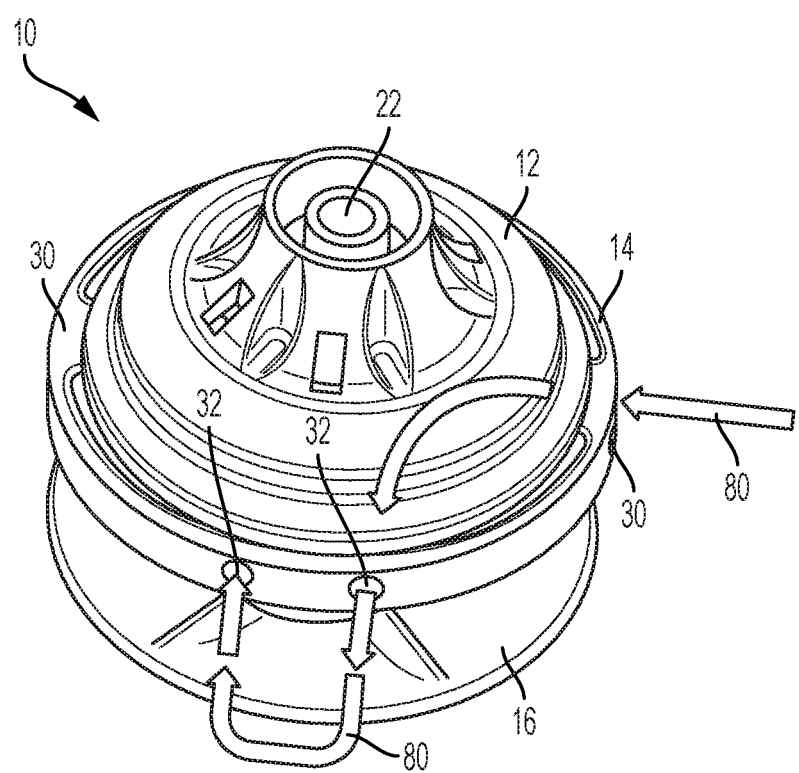
FIG. 5C illustrates continued feeding of the fixed-line trimmer line through the trimmer head.
Figure 5D:
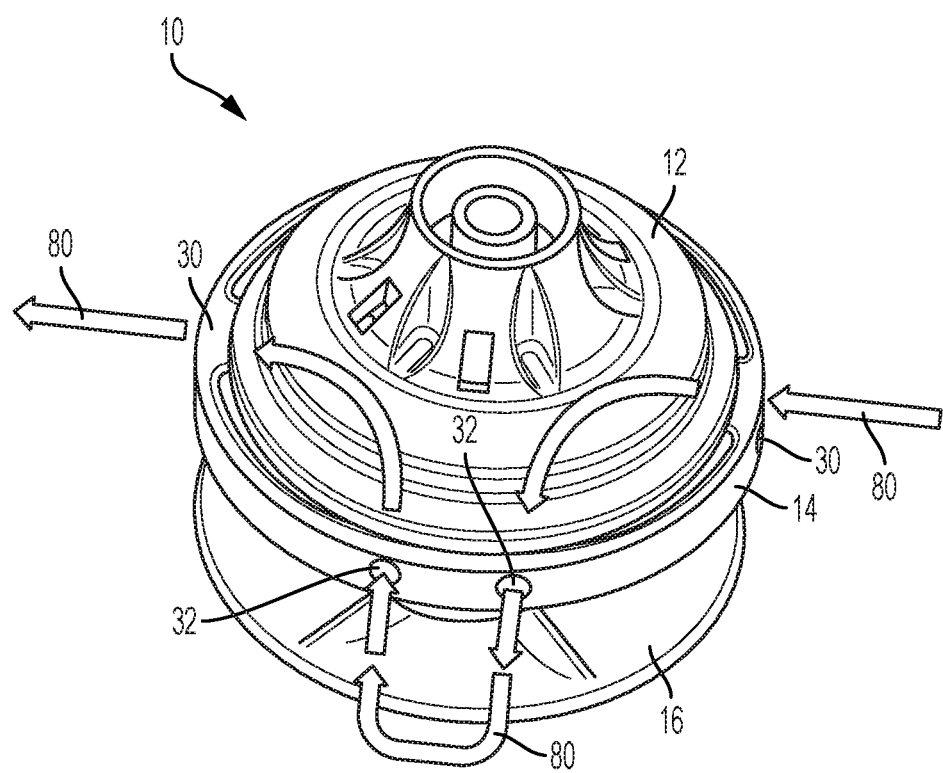
FIG. 5D illustrates continued feeding of the fixed-line trimmer line through the trimmer head.
Figure 5E:
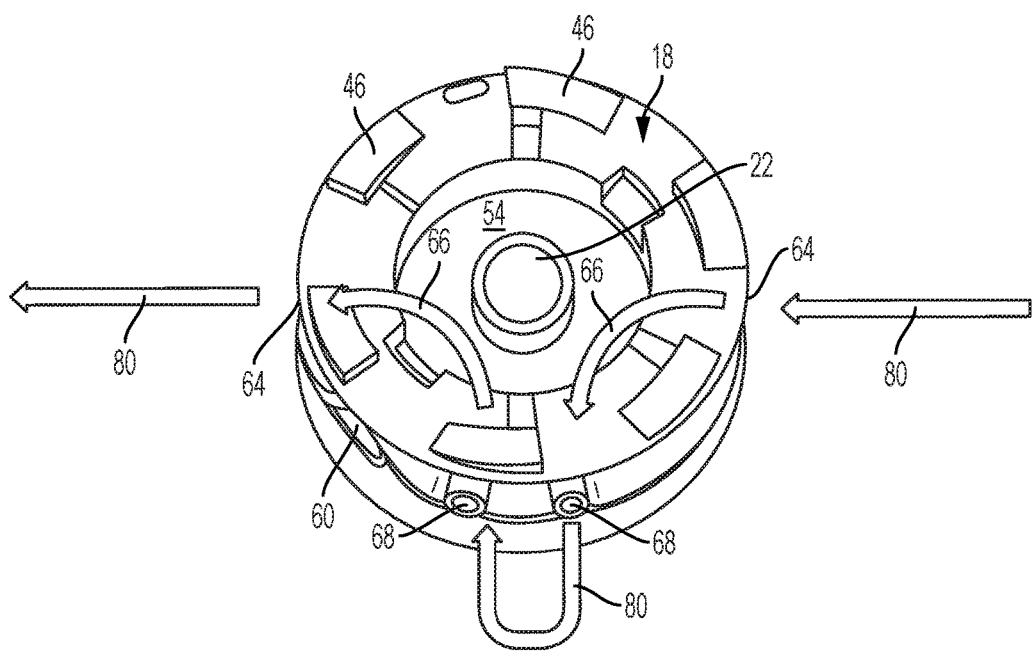
FIG. 5E illustrates the path of the fixed-line trimmer line after being fed through the spool.

Once the spool 18 is in locking engagement with the upper housing 12 and the second set of apertures of the spool 18 are aligned with corresponding apertures in the lower housing 13, the operator inserts and feeds a portion of a single fixed-line trimmer line 82 through one of the first apertures 30 of the lower housing 14, which causes the fixed-line trimmer line 82 to extend through the corresponding entrance aperture 64 of the spool 18 and along the guide groove 66 until the end of the fixed-line trimmer line 82 exits the exit aperture 68 of the spool 18 and the corresponding second aperture 32 of the lower housing 14, as shown in FIG. 5B. Approximately half of the fixed-line trimmer line 82 is then pulled through the trimmer head 10 and the end of the trimmer line 82 is then inserted into the other of the second apertures 32 of the lower housing and through the corresponding exit aperture 68 of the spool 18, as shown in FIG. 5C. The fixed-line trimmer line 82 is continued to be fed into the second aperture 32 of the lower housing 14, wherein the trimmer line 82 is fed through the exit aperture 68 of the spool 18, along the other guide groove 66 until the trimmer line 82 passes through the other entrance aperture 64 of the spool and exits the trimmer head 10 through the other first aperture 30 of the lower housing 14, as shown in FIG. 5D. Once the fixed-line trimmer line 82 is threaded through the trimmer head 10, the trimmer head 10 is rotated in a direction that causes the ramps 46 on the upper plate 40 of the spool 18 are forced into continuous engagement with the ribs 24 of the upper housing 12.

Figure 6:
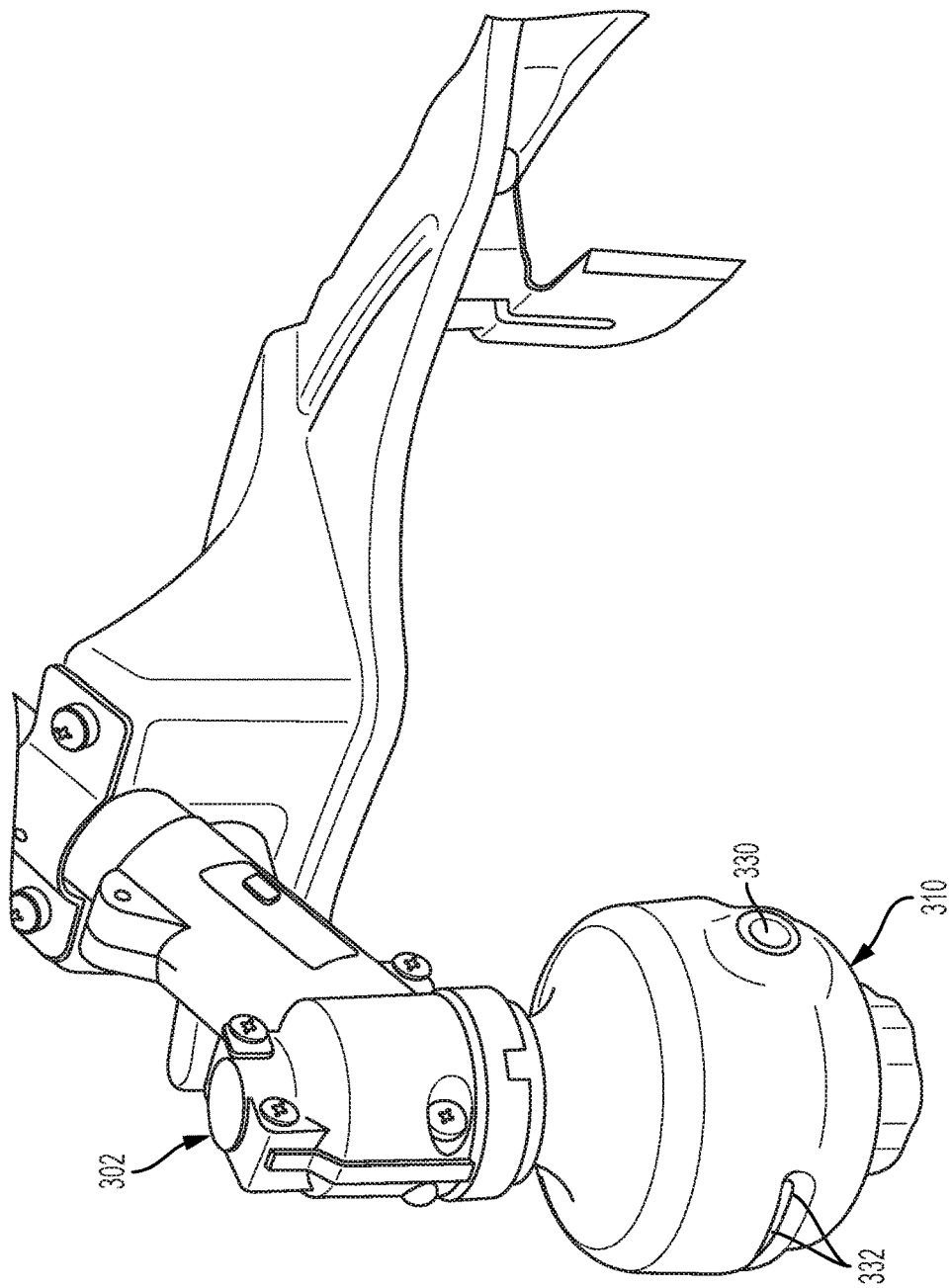
FIG. 6 is another exemplary embodiment of a multi-mode trimmer head.

Referring to FIG. 6, another exemplary embodiment of a multi-mode trimmer head 310 is shown. The trimmer head 310 is configured to provide both a fixed-line operating mode as well as a bump-feed operating mode separately, thereby providing at least two separate operating modes for the trimmer head 310. The trimmer head 310 is operable in only one of the operating modes at a time. It should be understood by one having ordinary skill in the art that operating the trimmer head 310 in the fixed-line operating mode first requires removal (and un-spooling) of the flexible trimmer line, if present; and operating the trimmer head 310 in the bump-feed operating mode first requires removal of the fixed-line trimmer line, if present. The trimmer head 310 is selectively switchable between the bump-feed operating mode and the fixed-line operating mode without having to disassemble the trimmer head 310 and without having to add or remove components therefrom. The trimmer head 310 includes an upper housing 312, a lower housing 314, a bump head 316, a spool 318 (FIG. 7), and a spring 320 (FIG. 7).

The upper housing 312 of the trimmer head 310, as shown in FIGS. 6-7, is shaped as a generally inverted bowl. The upper housing 312 includes a bolt shaft 322 through which a female threaded adapter (not shown) operatively connects the upper housing 312 to the outdoor handheld tool 302. In an embodiment, the upper housing 312 is formed of a nylon material, but it should be understood by one having ordinary skill in the art that the upper housing 312 can be formed of metal, PVC, or other material sufficient to withstand the repeated impacts from rocks, dirt, vegetation, and the like while still providing a relatively lightweight component. The upper housing 312 is releasably connectable to the outdoor handheld tool 302 for ease of removal and replacement, but the upper housing 312 is secured to the outdoor handheld tool which allows the trimmer head 310 to be rotated in order to cut vegetation. The upper housing 312 is operatively connected to the lower housing 314 to form a generally hollow housing. In an embodiment, the upper and lower housings 312, 314 are releasably attachable by way of cantilever-like spring tabs extending from the lower housing 314 that are received in corresponding apertures formed in the upper housing 312. The upper housing 312 of the embodiment shown in FIGS. 6-7 is formed substantially similar to the upper housing 12 shown in FIG. 4A, wherein the inner surface of the upper housing includes a plurality of ribs extending downwardly that cooperate with the ramps on the upper surface of the upper plate of the spool. As explained below, the ribs of the inner surface of the upper housing 312 do not include apertures configured to receive the ramps of the spool.

The lower housing 314 of the trimmer head 310 is operatively connected to the upper housing 312, as shown in FIGS. 6-7, wherein the lower housing 314 is releasably and fixedly attached to the upper housing 312. The lower housing 314 is generally formed as a bowl shape. In an embodiment, the lower housing 314 is formed of die cast metal, but it should be understood by one having ordinary skill in the art that the upper and lower housings 312, 314 can be formed of nylon, PVC, cast metal, or other material sufficient to be durable and withstand the repeated impacts from rocks, dirt, vegetation, and the like while still providing a relatively lightweight component. The upper and lower housings 312, 314 snap together to form an outer housing positioned about the spool 318, wherein the entire outer housing rotates during operation of the trimmer head 310. The mating surface of the upper and lower housings 312, 314 form a pair of first apertures 330 and a pair of second apertures 332. In some embodiments, an insert 331 is positioned between the upper and lower housings 312, 314 within the first apertures 330.

The pair of first apertures 330 are positioned generally across from each other, being oriented at about one-hundred eighty degrees (180°) therebetween, as shown in FIGS. 6-8B. The first apertures 330 are formed as eyelets, wherein each of the eyelets is configured to receive a separate length of bump head trimmer line when in the bump-feed operating mode. The first apertures 330 formed as eyelets are also configured to allow the distal ends of a portion of fixed-line trimmer line to exit therethrough when in the fixed-line operating mode. Each of the first apertures 330 is configured to allow only one portion of trimmer line to exit or enter therethrough at a time.

The pair of second apertures 332, as shown in FIGS. 6-8B, are positioned adjacent to each other on one side of the upper and lower housings 312, 314. The second apertures 332 are configured to allow a piece of fixed-line trimmer line to be threaded therethrough during the loading and unloading operations of the fixed-line trimmer line. In an embodiment, the second apertures 332 are oriented at about ninety degrees (90°) between the first apertures 330. The second apertures 332 are spaced slightly apart from each other, wherein the upper and lower housings 312, 314 cooperate to form a horizontal groove 333 that extends between the second apertures 332. The horizontal groove 333 is configured to receive the fixed trimmer line portion that extends between the second apertures 332 in the fixed-line operating mode.

The upper and lower housings 312, 314 also cooperate to form a generally vertical recess 335, as shown in FIGS. 6-8B. The vertical recess 335 is positioned between the radially-aligned second apertures 332. The vertical recess 335 is configured to be positioned below (radially inward) of the bend in the fixed-line trimmer line when in the fixed-line operating mode, and the vertical recess 335 allows the operator to extend a pair of fingers from opposite ends of the vertical recess 335 in order to easily grasp the fixed-line trimmer line 82.

The lower housing 314 includes a plurality of ribs (not shown) extending inwardly from the inner surface thereof. The ribs of the lower housing 314 are formed similar to the ribs of the upper housing 312. The ribs of the lower housing 314 are configured to engage ramps of the spool 318 to selectively prevent rotation of the spool relative to the lower housing 314 during operation of the trimmer head 310.

The bump head 316 is operatively connected to the lower housing 314, wherein a portion of the bump head 316 is located within the outer housing and the remaining portion extends out of the aperture in the lower housing 314, as shown in FIGS. 6-7. The bump head 316 includes a generally round disk 334 and a central member 336 extending from the round disk 334. The bump head 16 is selectively movable toward and away from the lower housing 314 as the operator taps the trimmer head 310 on the ground when used in the bump-feed operating mode.

Figure 9:
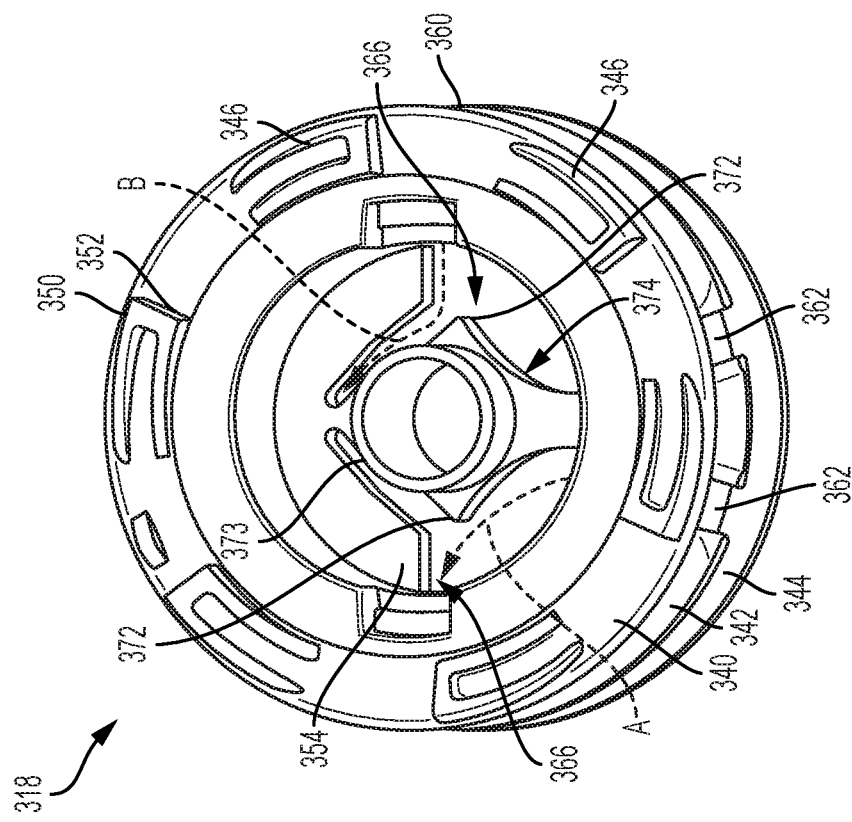
FIG. 9 is a top view of the spool of the trimmer head shown in FIG. 6.

In an embodiment, the spool 318 includes an upper plate 340, a central plate 342, and a lower plate 344, wherein the plates are spaced-apart from each other, as shown in FIGS. 7 and 9. A plurality of ramps 346 extend upwardly from the upper surface of the upper plate 340. The ramps 346 are angled projections that are aligned in a generally circumferential manner adjacent to the outer radial edge of the upper plate 340. Each ramp 346 includes an angled surface 350 and a stop surface 352. The ramps 346 are positioned about a central bore 354, which forms a recessed region in the center of spool 318. Rotation of the spool 318 in response to sliding contact between the ribs 324 of the upper housing 312 and the angled surfaces 350 of the ramps 346 on the upper plate 340 of the spool 318 will be described in more detail below. As shown in FIG. 7, a plurality of ramps 346 extend downwardly from the lower surface of the lower plate 344—similar to the ramps 346 formed on the upper plate 340. The ramps 346 are angled projections that are aligned in a generally circumferential manner adjacent to the outer radial edge of the lower plate 344. The engagement of the ramps 346 on the lower plate 344 of the spool 318 and the ribs (not shown) of the lower housing 314 will be described in more detail below.

The spacing between the plates of the spool 318 provide an upper channel 356 and a lower channel 358, wherein the upper channel 356 is formed between the upper plate 340 and the central plate 342, and the lower channel 358 is formed between the central plate 342 and the lower plate 344, as shown in FIGS. 7 and 9. The upper and lower channels 356, 358 are configured to receive flexible trimmer line that is wound about the central bore 354 in a bump-feed operating mode.

As shown in FIGS. 7 and 9, the spool 318 includes a first set of apertures for receiving a flexible trimmer line in a bump-feed operating mode and a second set of apertures for receiving a semi-rigid trimmer line in a fixed-line operating mode. The first set of apertures being formed as winding apertures 360, and the second set of apertures being formed as holding apertures 362. Each of the winding apertures 360 is operatively connected to a corresponding holding apertures 362 by way of a guide channel 366 formed into the top surface of the central plate 342, as will be explained below. In an embodiment, the winding apertures 360 are substantially coplanar with the holding apertures 362 on the central plate 342. The central plate 342 includes a pair of winding apertures 360 that extend from the outer radial edge of the central plate 342 to the wall defining the central bore 354. Each of the winding apertures 360 is configured to receive a portion of flexible trimmer line from a location external to the trimmer head 310 to allow the flexible trimmer line to be wound onto the spool 318. The outer opening of the winding apertures 360 are alignable with corresponding first apertures 330 of the outer housing in the bump-feed operating mode to allow flexible trimmer line to be inserted through the first apertures 330 to be received through the winding apertures 360. The shape of the winding apertures 360 is configured such that once the flexible line is inserted through each winding aperture 360 and the spool 318 is rotated relative to the upper and lower housings 312, 314, then the flexible line is wound about the central bore 354 and into either the upper or lower channel 356, 358. Flexible trimmer line (not shown) inserted into one of the winding apertures 360 is windable into the upper channel 356, and flexible trimmer line (not shown) inserted into the other winding apertures 360 is windable into the lower channel 358, wherein the flexible line in each channel feeds a portion of the flexible line out of the corresponding winding aperture 360 in response to the bump head 316 being contacted with the ground in a line-feeding operation. When flexible trimmer line is inserted into the winding apertures 360, the flexible trimmer line follows the corresponding guide channel 366 in the upper surface of the central plate 342 until the flexible trimmer line contacts the end of the guide channel 366. In an embodiment, the end of each piece of flexible trimmer line is positively held or otherwise secured within the guide channel 366. In other embodiments, the curvature of the guide channel 366 prevents accidental withdrawal of the flexible trimmer line without any contact by springs or other securing mechanisms within the guide channel 366.

The pair of holding apertures 362 are positioned on the central plate 342, oriented substantially in the same plane as the winding apertures 360, as shown in FIGS. 7 and 9. The holding apertures 362 are operatively connected to the winding aperture 360 by way of a channel or guide groove 366 formed into the portion of the upper surface of the central plate 342 within the central bore 354. The holding apertures 362 are configured to receive semi-rigid trimmer line for use in a fixed-line operating mode. The holding apertures 362 are shaped such that when the semi-rigid trimmer line is inserted therein, the semi-rigid trimmer line travels along the guide groove 366 within the central bore 354 until it exits a corresponding winding aperture 360.

Figure 10:
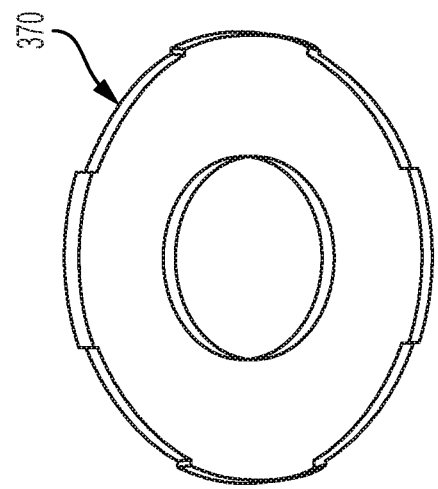
FIG. 10 is a top view of a ring disposed in the spool shown in FIG. 9.

A cover ring 370, as shown in FIG. 10, is positioned within the central bore 354 adjacent to the upper surface of the central plate 342, wherein the cover ring 370 is press-fit into the central bore 354 to form a pair of fully-enclosed the guide channels 366 that extend between each of the winding and holding apertures 360, 362. In an embodiment, the cover ring 370 is formed as an annular member having an upwardly-turned inner peripheral surface as well as an upwardly-turned outer diameter surface. The outer peripheral surface is scalloped or otherwise includes offsets that allow the cover ring 370 to be press-fit into the central bore 354.

The guide channels 366 formed on the upper surface of the central plate 342 within the central bore 354 are separate recesses which maintains separation between pieces of flexible trimmer line or between ends of a semi-rigid trimmer line, as shown in FIG. 9. Each guide channel 366 forms a first path A along which semi-rigid trimmer line travels when installing trimmer line in the fixed-line operating mode as well as a second path B along which flexible trimmer line travels when installing trimmer line in the bump-feed operating mode. The guide channel 366 is partially defined by a raise point 372 which separates the bump-feed pathway 373 and the fixed-line pathway 374. This point 372 provides a barrier to prevent the flexible trimmer line from exiting a holding aperture 362 when loading trimmer line for the bump-feed operating mode. Instead, the point 372 directs the flexible trimmer line into the bump-feed pathway 373 until the flexible trimmer line contacts the end of the pathway 373. The point 372 also provides a barrier to prevent the semi-rigid trimmer line from entering the bump-feed pathway 373 when loading trimmer line for the fixed-line operating mode. Instead, the point 372 directs the semi-rigid trimmer toward (and out of) the guide channel 366 by way of the winding aperture 360.

The trimmer head 310 is switchable between the bump-feed operating mode and the fixed-line operating mode (and vice-versa) without needing to disassemble the trimmer head 310 in order to re-position the spool 318 therewithin to switch between operative modes. The trimmer head 310 also does not need to be disassemble (and subsequently re-assembled) in order to add/remove additional components to switch between modes. The trimmer head 310 is configured to be selectively switchable between the bump-feed operating mode and the fixed-line operating mode by simply removing the trimmer line previously installed and install the new trimmer line for the opposite operating mode. For both operating modes, the user/operator must first align the winding apertures 360 of the spool 318 with the first apertures 330 of the outer housing; for the fixed-line operating mode, the user/operator must also align the holding apertures 362 of the spool 318 with the second apertures 332 of the outer housing. Once the apertures of the spool 318 are aligned with the corresponding apertures of the outer housing, the trimmer lines can be installed in the manner described below.

The bump head 316 is operatively connected to the spool 318 such that these components rotate together. In an embodiment, the bump head 316 and spool 318 include an interlocking mechanism (not shown) for attaching the bump head 316 directly to the spool 318 to form a unitary piece upon assembly. In another embodiment, the bump head 316 is separate from the spool 318 and is only in selective contact engagement therewith.

In an embodiment, the spring 320 is positioned within the central bore 354 of the spool 318, positioned adjacent to the upper surface of the central plate 342 and surrounding the bolt shaft 322 of the spool 318. The spring 320 is located between the upper surface of the central plate 342 and the inner surface of the upper housing 312 so as to bias the spool 318 downward toward the lower housing 314. In an embodiment, as the spring biases the spool 318 toward the lower housing 314, the ramps 346 of the lower plate 344 of the spool 318 engage the ribs (not shown) of the lower housing 314.

For the bump-feed operating mode, the spring 320 biases the spool 318 toward the lower housing 314 such that the stop surface 352 of at least one ramp 346 that extends downwardly from the lower plate 344 of the spool 318 engages one of the ribs (not shown) extending upwardly from the inner surface of the lower housing 314. In an embodiment, the bump head 316 is rotated such that the ramp(s) 346 are rotated in a direction away from the ribs of the lower housing 314 until the winding apertures 360 of the spool 318 are aligned with the first apertures 330 of the outer housing. Once the winding apertures 360 are aligned with the first apertures 330, a separate piece of flexible trimmer line 380 is inserted into each of the opposing first apertures 330. As the flexible trimmer line 380 is inserted into the first aperture 330, the trimmer line enters the winding aperture 360 of the spool 318 and is guided such that the distal end of the flexible trimmer line 380 contacts the end of the guide channel 366, thereby securing the flexible trimmer line 380 within the spool 318.

The operator then rotates the bump head 816 which causes the spool 318 to rotate relative to the outer housing. As the spool 318 rotates within the housing, the pair of flexible trimmer lines 380 are wound onto the spool 318 and into the upper and lower channels 356, 358. As the bump head 316 is rotated, the angled surfaces 350 of the ramps 346 on the lower plate 344 of the spool 318 slide along the ribs of the lower housing 314, which causes slight movement of the spool 318 along the axis of the bolt shaft 322. This movement compresses the spring 320 such that when the spool 318 rotates such that the ribs of the lower housing 314 pass beyond the stop surfaces of the ramps 346, the spring 320 biases the spool 318 back toward the lower housing 314.

As the trimmer head 310 is pushed toward the ground, the bump head 316 contacts the ground which forces the bump head 316 toward the lower housing 314 and against the bias of the spring 320. As the bump head 316 moves toward the lower housing 314, the bump head 316 simultaneously pushes the spool 318 in the same direction. As the spool 318 moves toward the upper housing 312, the stop surfaces 352 of the ramps 346 on the lower plate 344 disengage from the ribs of the lower housing 314. Once the spool 318 is disengaged from the lower housing 314, the spool 318 tends to rotate slower than the lower housing 314 such that the ribs of the lower housing 314 move past the stop surfaces 352 and over the angled surfaces 350. The angled surfaces 350 of the ramps 346 on the upper plate 340 of the spool 318 are aligned with the ribs 324. As such, as the spool 318 is moved axially toward the upper housing 312, the ribs 324 contact the angled surfaces 350 which cause the ribs 324 to slide down the angled surfaces 350, thereby causing initial rotation of the spool 318 relative to the upper housing. Simultaneously, centrifugal forces of the flexible trimmer line 380 causes the spool 318 to continue to rotate relative to the lower housing 314, wherein such relative rotation results in additional flexible trimmer line 380 is fed out the first apertures 330 to increase the length of trimmer line extending from the trimmer head 310. As the trimmer head 310 is moved away from the ground, the spring 320 biases the spool 318 toward the lower housing 314 such that the stop surface(s) 352 of the ramp(s) 346 engage the ribs of the lower housing 314 to prevent additional length of flexible trimmer line 380 from being fed out.

For the fixed-line operating mode of the trimmer head 310, the operator rotates the spool 318 twisting or turning the bump head 316 until the winding apertures 360 of the spool 318 are aligned with the first apertures 330 of the outer housing and the holding apertures 362 are aligned with the second apertures 332 of the outer housing. Once in this position, a length of semi-rigid trimmer line is positioned in the trimmer head 310 by inserting each opposing distal end of the trimmer line into one of the second apertures 332 of the outer housing and pushing on the trimmer line as each end of the trimmer line passes through the holding aperture 362 of the spool 318, then contacts and is guided through the guide channel 366 of the spool 318 until the point 372 directs the end of the trimmer line out of the trimmer head 310 through the winding aperture 360 of the spool 318 and the corresponding first aperture 360 of the outer housing. Once both of the distal ends of the semi-rigid trimmer line extend laterally from the trimmer head 318, the operator can push the bend in the trimmer line until it is seated within the horizontal groove 333 that extends between the second apertures 362 of the housing, thereby positively positioning or securing the semi-rigid trimmer line relative to the trimmer head 310. Although the spool 318 is not locked against all rotation relative to the upper and lower housings 312, 314, the strength of the semi-rigid trimmer line that extends through the winding apertures 360 of the spool 318 and the first apertures 330 of the outer housing effectively prevent such relative rotation.

Figure 11:
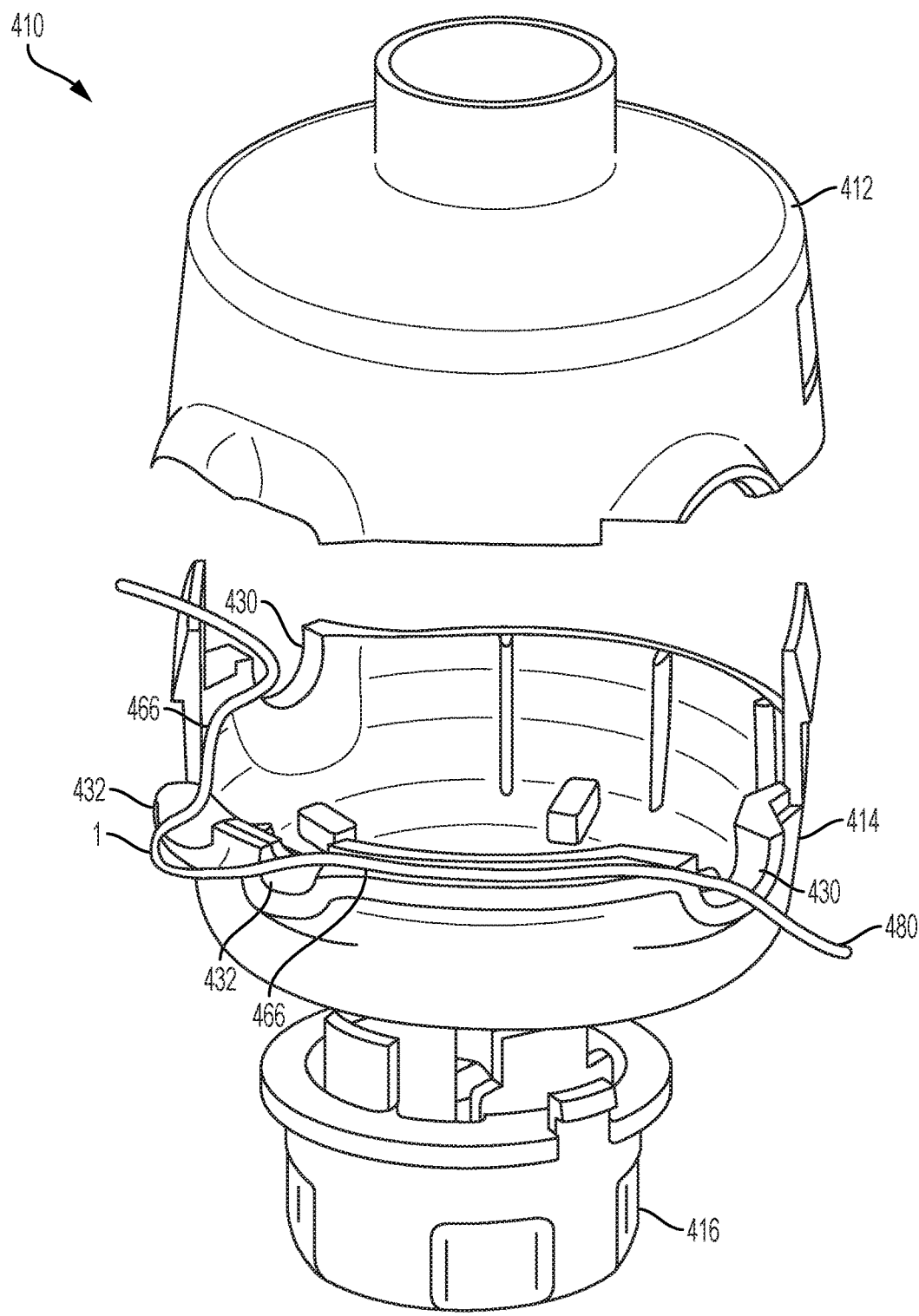
FIG. 11 is an exploded view of yet another exemplary embodiment of a multi-mode trimmer head.

Referring to FIG. 11, yet another embodiment of a multi-mode trimmer head 410 is shown. The trimmer head 410 is configured to provide both a fixed-line operating mode as well as a bump-feed operating mode separately, thereby providing at least two separate operating modes for the trimmer head 410. The trimmer head 410 is operable in only one of the operating modes at a time. It should be understood by one having ordinary skill in the art that operating the trimmer head 410 in the fixed-line operating mode first requires removal (and un-spooling) of the flexible trimmer line, if present; and operating the trimmer head 410 in the bump-feed operating mode first requires removal of the fixed-line trimmer line, if present. The trimmer head 410 includes an upper housing 412, a lower housing 414, a bump head 416, a spool (not shown), and a spring (not shown).

The upper and lower housings 412, 414 are substantially similar to the upper and lower housings described above and shown in the other embodiments. The upper and lower housings 412, 414 of the embodiment shown in FIG. 11 further includes a guide groove 466 formed along the mating surface of both the housings. The guide grooves 466 are formed as recesses in either the upper housing 412, the lower housing 414, or both the upper and lower housings 412, 414, extending between the second apertures 432 and the first apertures 430. The guide grooves 466 are configured to receive a portion of a semi-rigid trimmer line used in the fixed-line operating mode. To switch the trimmer head 410 to the fixed-line operating mode, the operator inserts the opposing distal ends of a length of semi-rigid trimmer line 480 into each of the second apertures 432 of the outer housing and threads the trimmer line 480 through the guide grooves 466 until the ends of the trimmer line 480 exit through and extend from the first apertures 430. Although FIG. 11 does not show the spool and other components, the trimmer head 410 includes these components as described above but are removed in this figure.

Referring to FIGS. 12A-16, yet another exemplary embodiment of a multi-mode trimmer head 510 is shown. The trimmer head 510 is configured to provide both a fixed-line operating mode as well as a bump-feed operating mode separately, thereby providing at least two separate operating modes for the trimmer head 510. The trimmer head 510 is operable in only one of the operating modes at a time. It should be understood by one having ordinary skill in the art that operating the trimmer head 510 in the fixed-line operating mode first requires removal (and un-spooling) of the flexible trimmer line, if present; and operating the trimmer head 510 in the bump-feed operating mode first requires removal of the fixed-line trimmer line, if present. The trimmer head 510 is selectively switchable between the bump-feed operating mode and the fixed-line operating mode without having to disassemble the trimmer head 510 and without having to add or remove components therefrom. The trimmer head 510 includes an upper housing 512, a lower housing 514, a bump head 516, a spool 518 (FIG. 16A-E), a spring 520 (FIG. 13), a cover ring 570, and a retainer 521.

The upper housing 512 of the trimmer head 510, as shown in FIGS. 14A-C, is shaped as a generally inverted bowl. The upper housing 512 includes a bolt shaft 522 through which a female threaded adapter (not shown) operatively connects the upper housing 512 to the outdoor handheld tool 302 (FIG. 6). In an embodiment, the upper housing 512 is formed of a nylon material, but it should be understood by one having ordinary skill in the art that the upper housing 512 can be formed of metal, PVC, or other material sufficient to withstand the repeated impacts from rocks, dirt, vegetation, and the like while still providing a relatively lightweight component. The upper housing 512 is releasably connectable to the outdoor handheld tool 302 for ease of removal and replacement, but the upper housing 512 is secured to the outdoor handheld tool which allows the trimmer head 510 to be rotated in order to cut vegetation. The upper housing 512 is operatively connected to the lower housing 514 to form a generally hollow housing. In an embodiment, the upper and lower housings 512, 514 are releasably attachable by way of cantilever-like spring tabs 523 extending from the lower housing 514 that are received in corresponding apertures 525 formed in the upper housing 512. The inner surface of the upper housing 512 includes a plurality of ribs 524 extending downwardly that cooperate with the ramps 546 on the upper surface of the upper plate of the spool 518.

A portion of the upper housing 512 forms part of a pair of first apertures 530 and part of a pair of second apertures 532, wherein the first and second apertures 530, 532 are configured to receive flexible trimmer line in the bump-feed operating mode and trimmer line in the fixed-line operating mode, as shown in FIGS. 14A-14C. The first apertures 530 defined between the upper and lower housings 512, 514 are positioned on opposing sides of the housing. The second apertures 532 defined between the upper and lower housings 512, 514 are poisoned adjacent to each other. Although FIGS. 14A-14C and 15A-15D show the first and second apertures 530, 532 as being partially formed into each of the upper and lower housings 512, 514, it should be understood by one having ordinary skill in the art that these apertures can all be formed on the upper housing 512 or the lower housing 514, or one pair of apertures formed on the upper housing 512 and the other pair of apertures formed on the lower housing 514.

Figure 13:
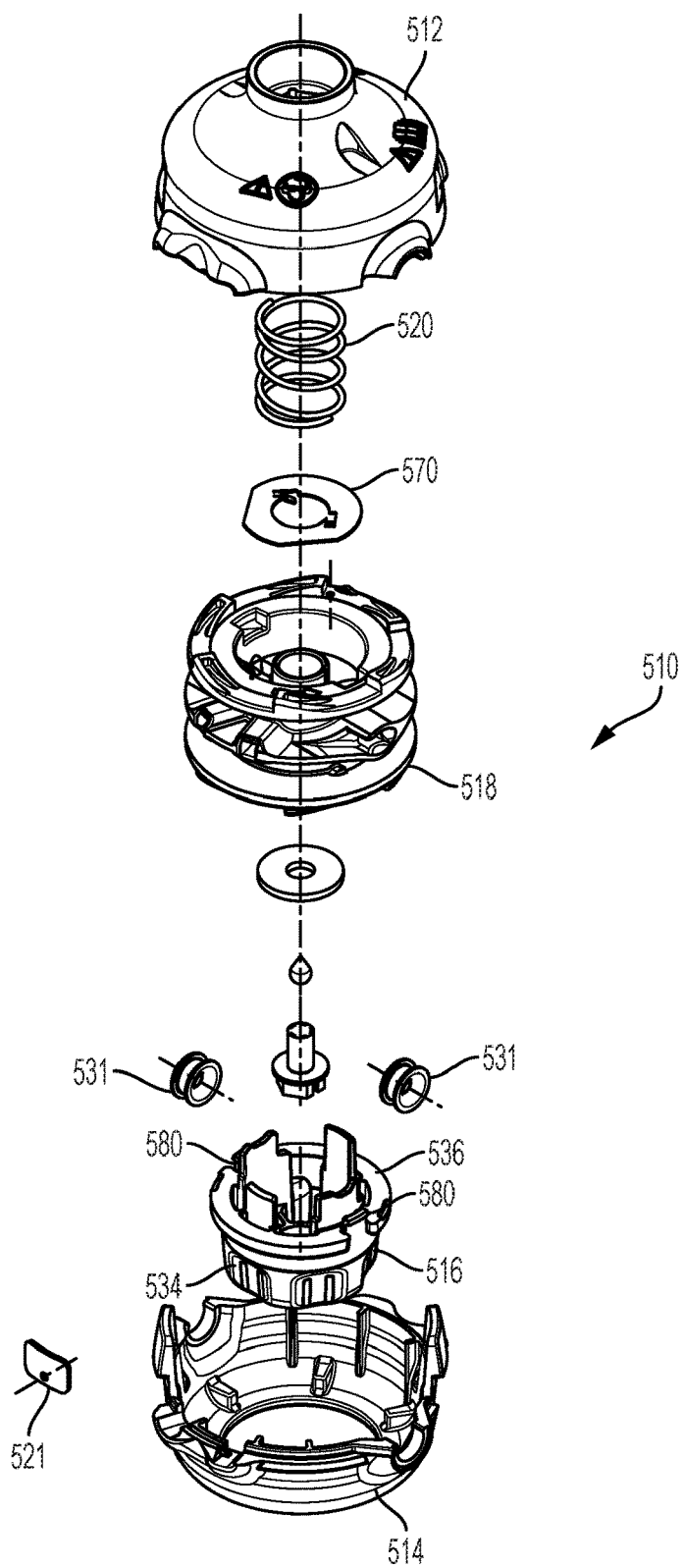
FIG. 13 is an exploded view of the trimmer head shown in FIG. 12A.

In the embodiment illustrated in FIGS. 14B-14C, the upper housing 512 includes a notch 527 positioned within the sidewall that mates with the lower housing 514. The notch 527 is located between the second apertures 532 and is configured to receive the retainer 521 (FIG. 13). The notch 527 is curved in the same manner as the curvature of the sidewall of the upper housing 512.

The lower housing 514 of the trimmer head 510 is operatively connected to the upper housing 512, as shown in FIGS. 6-7, wherein the lower housing 514 is releasably and fixedly attached to the upper housing 512. The lower housing 514 is generally formed as a bowl shape. In an embodiment, the lower housing 514 is formed of die cast metal, but it should be understood by one having ordinary skill in the art that the upper and lower housings 512, 514 can be formed of nylon, PVC, cast metal, or other material sufficient to be durable and withstand the repeated impacts from rocks, dirt, vegetation, and the like while still providing a relatively lightweight component. The upper and lower housings 512, 514 snap together to form an outer casing positioned about the spool 518, wherein the entire outer housing rotates during operation of the trimmer head 510. As described above, the mating surface of the upper and lower housings 512, 514 form a pair of first apertures 5 and a pair of second apertures 532. In some embodiments, an insert 531 is positioned between the upper and lower housings 512, 514 within the first apertures 530, as shown in FIG. 13.

Figure 15A:
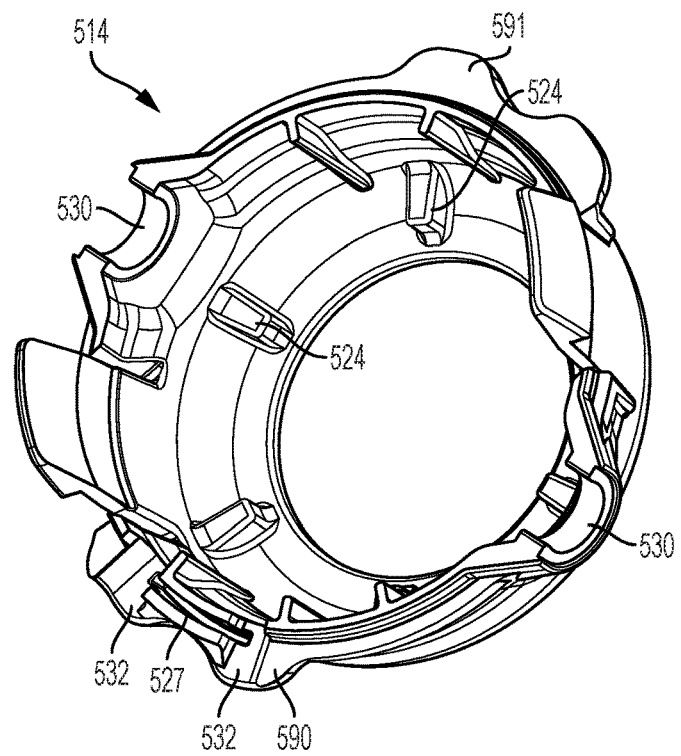
FIG. 15A is a top perspective view of a lower housing of the trimmer head shown in FIG. 12A.
Figure 15B:
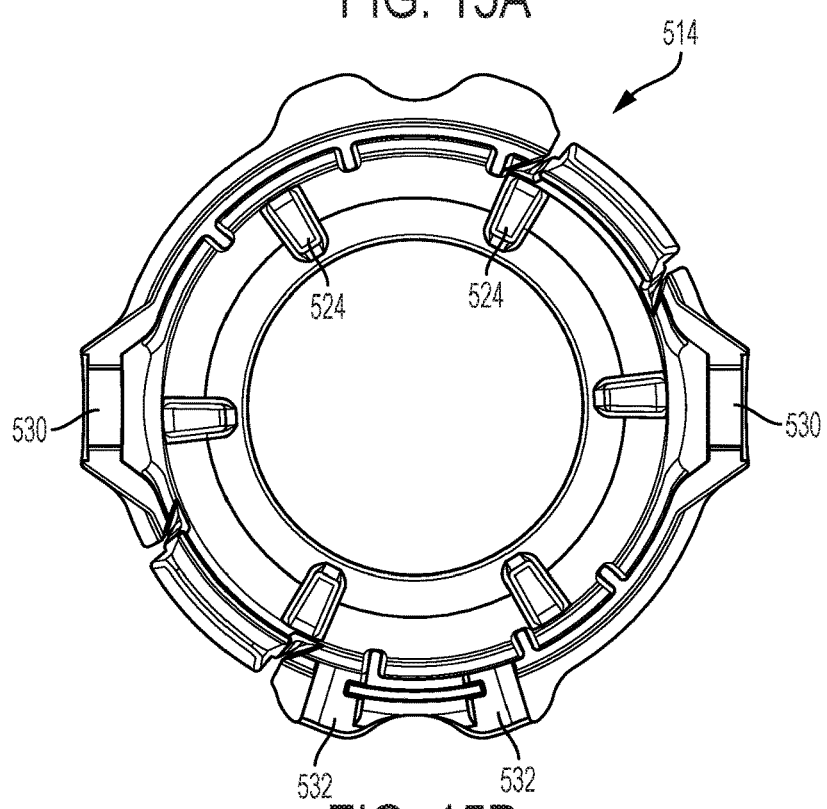
FIG. 15B is a top view of the lower housing shown in FIG. 15A.

In the embodiment illustrated in FIGS. 15A-15B, the lower housing 514 includes a notch 527 positioned within the sidewall that mates with the upper housing 512. The notch 527 is located between the second apertures 532 and is configured to receive the retainer 521 (FIG. 13). The notch 527 is curved in the same manner as the curvature of the sidewall of the lower housing 514.

The pair of first apertures 530 are positioned generally across from each other, being oriented at about one-hundred eighty degrees (180°) therebetween, as shown in FIGS. 12C-12D, 14B, and 15A. The first apertures 530 are formed as eyelets, wherein each of the eyelets is configured to receive a separate length of flexible trimmer line for use in the bump-feed operating mode. In the bump-feed operating mode, a separate piece of flexible trimmer line is inserted into each of the opposing first apertures 530 and wound onto the spool 518. The first apertures 530 formed as eyelets are also configured to allow the distal ends of a portion of fixed-line trimmer line to exit therethrough when in the fixed-line operating mode. Each of the first apertures 530 is configured to allow only one portion of trimmer line to exit or enter therethrough at a time.

Figure 12B:
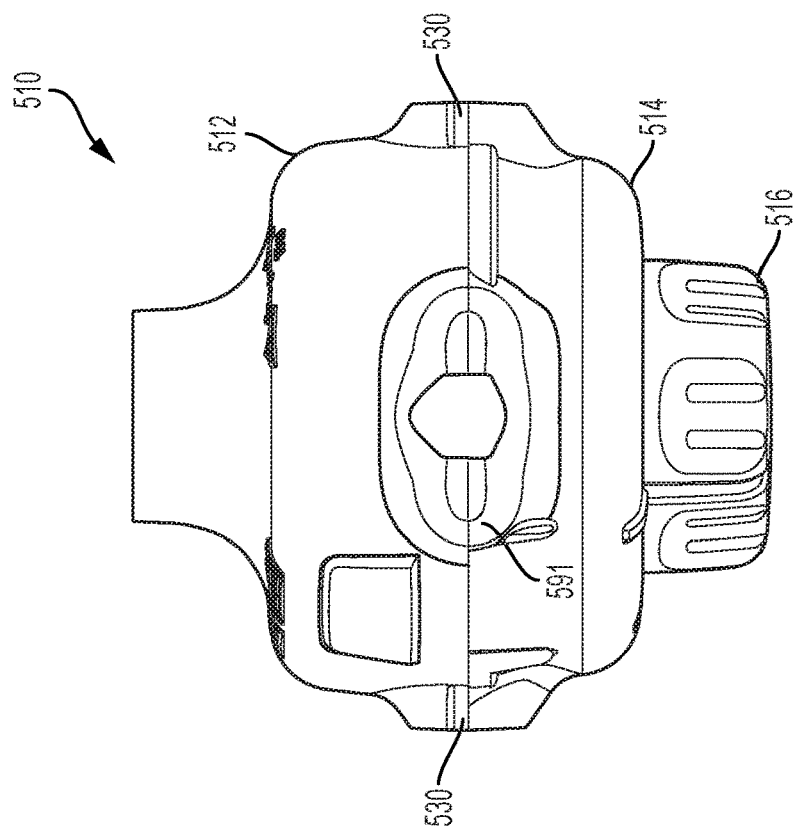
FIG. 12B is another side view of the trimmer head shown in FIG. 12A.
Figure 12A:
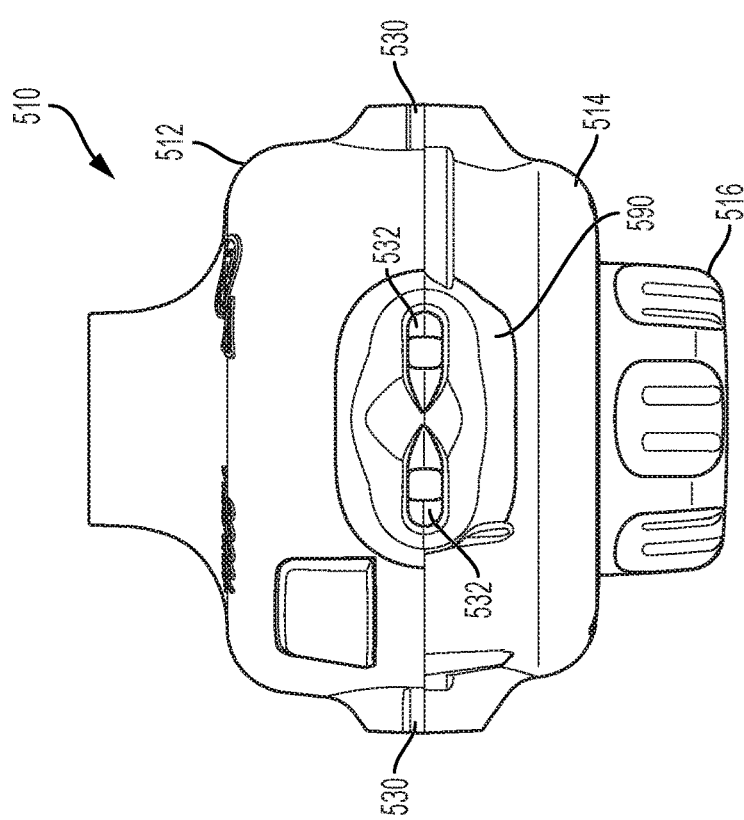
FIG. 12A is a first side view of an embodiment of a multi-mode trimmer head.
Figure 12D:
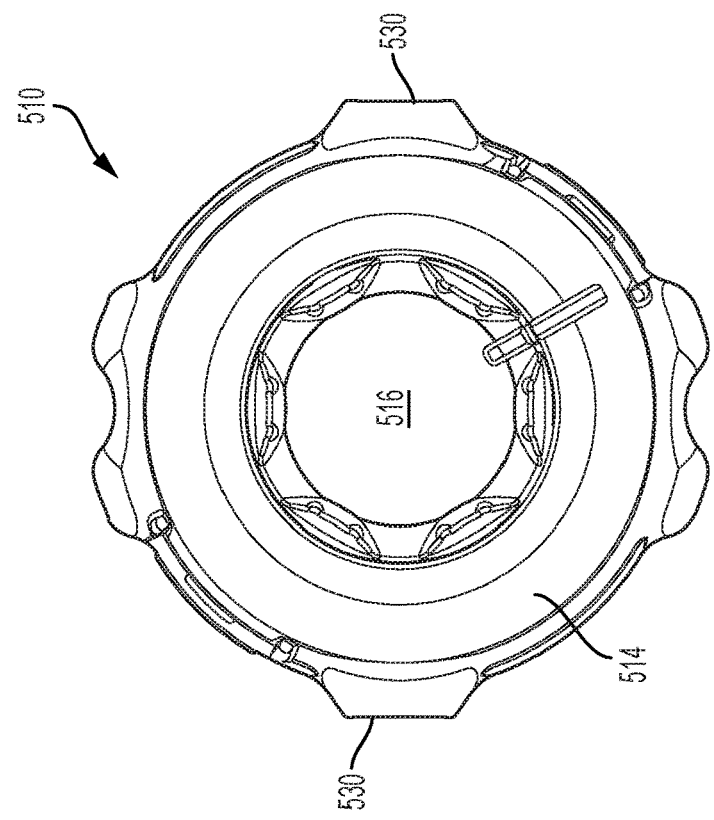
FIG. 12D is a bottom view of the trimmer head shown in FIG. 12A.
Figure 12C:
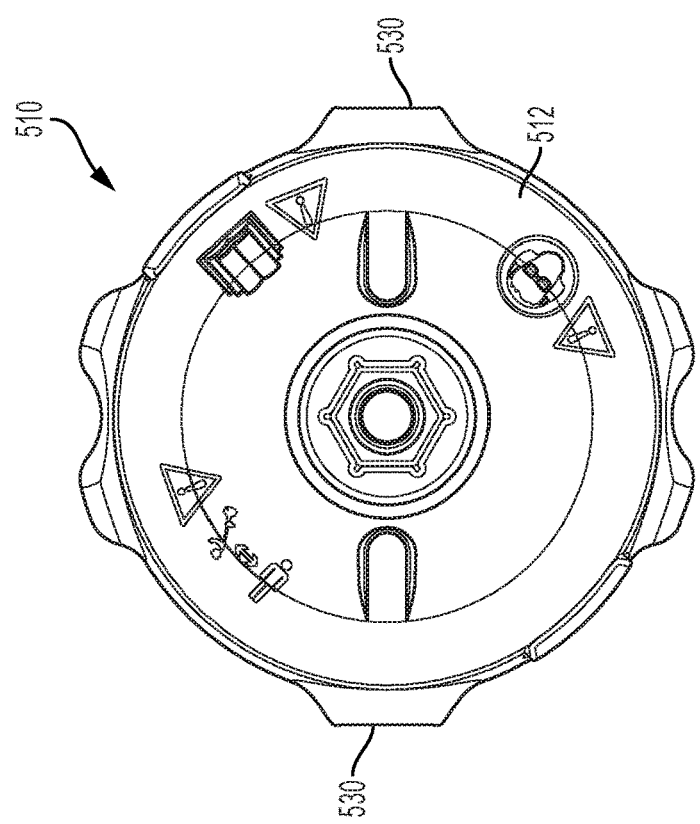
FIG. 12C is a top view of the trimmer head shown in FIG. 12A

The pair of second apertures 532, as shown in FIGS. 12A, 14B, and 15A, are positioned adjacent to each other on one side of the upper and lower housings 512, 514. The second apertures 532 are configured to allow a piece of fixed-line trimmer line to be threaded therethrough during the loading and unloading operations of the fixed-line trimmer line. In an embodiment, the second apertures 532 are oriented at about ninety degrees (90°) between the first apertures 530. The second apertures 532 are spaced slightly apart from each other, wherein the upper and lower housings 512, 514 cooperate to form a horizontal groove 333 that extends between the second apertures 532. The horizontal groove 333 is configured to receive the fixed trimmer line portion that extends between the second apertures 532 in the fixed-line operating mode.

The upper and lower housings 512, 514 also cooperate to form a generally vertical recess 335, as shown in FIGS. 6-8B. The vertical recess 335 is positioned between the radially-aligned second apertures 532. The vertical recess 335 is configured to be positioned below (radially inward) of the bend in the fixed-line trimmer line when in the fixed-line operating mode, and the vertical recess 335 allows the operator to extend a pair of fingers from opposite ends of the vertical recess 335 in order to easily grasp the fixed-line trimmer line 82.

The lower housing 514 includes a plurality of ribs 524 extending inwardly from the inner surface thereof, as shown in FIGS. 15A-15B. The ribs 524 of the lower housing 514 are formed similar to the ribs of the upper housing 512. The ribs 524 of the lower housing 514 are configured to engage ramps 546 of the spool 518 to selectively prevent rotation of the spool 518 relative to the lower housing 514 during operation of the trimmer head 510.

The bump head 516 is operatively connected to the lower housing 514, wherein a portion of the bump head 516 is located within the outer housing and the remaining portion extends out of the aperture in the lower housing 514, as shown in FIG. 13. The bump head 516 includes a generally round disk 534 and a central member 536 extending from the round disk 534. The bump head 516 is selectively movable toward and away from the lower housing 514 as the operator taps the trimmer head 510 on the ground when used in the bump-feed operating mode.

Figure 16A:
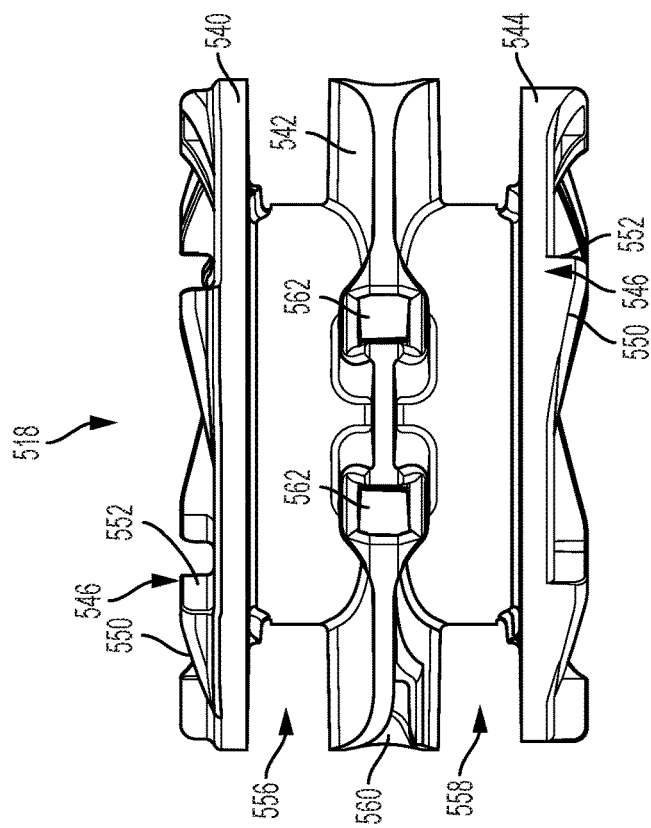
FIG. 16A is a top perspective of an embodiment of a spool.
Figure 16B:
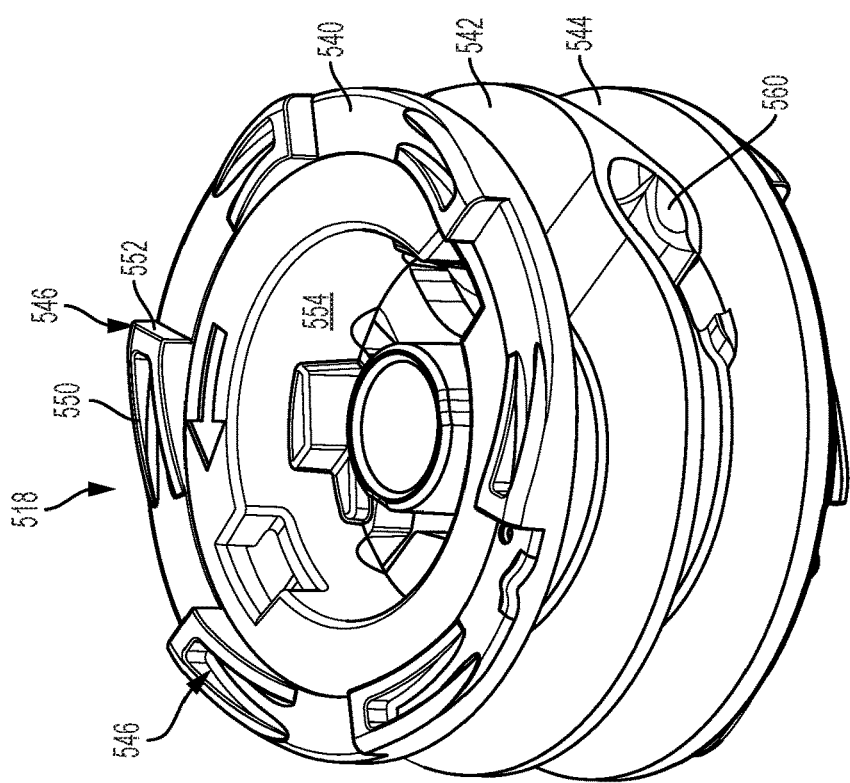
FIG. 16B is a side view of the spool shown in FIG. 16A.

In an embodiment, the spool 518 includes an upper plate 540, a central plate 542, and a lower plate 544, wherein the plates are spaced-apart from each other, as shown in FIGS. 16A-16D. A plurality of ramps 546 extend upwardly from the upper surface of the upper plate 540. The ramps 546 are angled projections that are aligned in a generally circumferential manner adjacent to the outer radial edge of the upper plate 540. Each ramp 546 includes an angled surface 550 and a stop surface 552. The ramps 546 are positioned about a central bore 554, and the central bore 554 forms a recessed region in the center of spool 518. Rotation of the spool 518 in response to sliding contact between the ribs 524 of the upper housing 512 and the angled surfaces 550 of the ramps 546 on the upper plate 540 of the spool 518 will be described in more detail below. As shown in FIG. 16B, a plurality of ramps 546 extend downwardly from the lower surface of the lower plate 544—similar to the ramps 546 formed on the upper plate 540. The ramps 546 are angled projections that are aligned in a generally circumferential manner adjacent to the outer radial edge of the lower plate 544. The engagement of the ramps 546 on the lower plate 544 of the spool 518 and the ribs 524 (FIGS. 15A-15B) of the lower housing 514 will be described in more detail below.

The spacing between the plates of the spool 518 provide an upper channel 556 and a lower channel 558, wherein the upper channel 556 is formed between the upper plate 540 and the central plate 542, and the lower channel 558 is formed between the central plate 542 and the lower plate 544, as shown in FIG. 16B. The upper and lower channels 556, 558 are configured to receive flexible trimmer line that is wound about the central bore 554 in a bump-feed operating mode.

As shown in FIGS. 16A-16D, the spool 518 includes a first set of apertures for receiving a flexible trimmer line in a bump-feed operating mode and a second set of apertures for receiving a semi-rigid trimmer line in a fixed-line operating mode. The first set of apertures are formed as winding apertures 560, and the second set of apertures being formed as holding apertures 562. Each of the winding apertures 560 and holding aperture 562 is operatively connected to a guide channel 566 formed into the top surface of the central plate 542, as will be explained below.

Figure 16C:
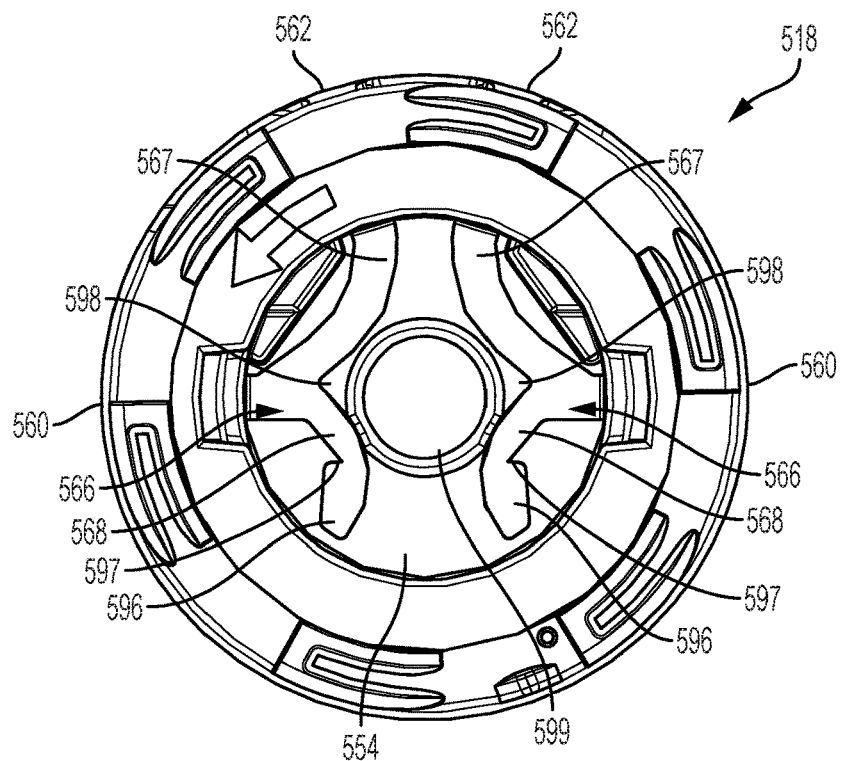
FIG. 16C is a top view of the spool shown in FIG. 16A
Figure 16D:
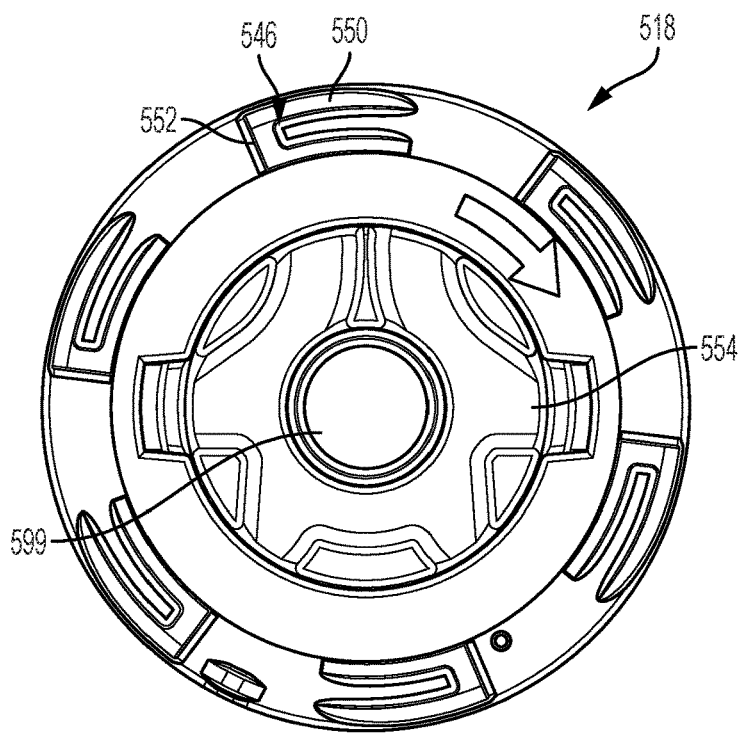
FIG. 16D is a bottom view of the spool shown in FIG. 16A.

As shown in FIG. 16C, a pair of guide channels 566 are formed into the top surface of the central plate 542, wherein the guide channels 566 are connected to the pair of winding apertures 560 as well as to the pair of holding apertures 562. Each guide channel 566 includes a pair of first passages 567, wherein each first passage 567 extends between one of the winding apertures 560 and the adjacent holding aperture 562. This first passage 567 is curved so as to travel around the central core 599 without passing therethrough. In an embodiment, the first passage 567 forms an arcuate channel. It should be understood by one having ordinary skill in the art that the first passage 567 can be formed of any shape so long as the first passage 567 extends between a winding aperture 560 and the adjacent holding aperture 562 without having sharp curves or other features that would otherwise obstruct or prevent a piece of trimmer line from being easily fed through the first passage 567.

Each guide channel 566 further includes a second passage 568 that extends from one of the winding apertures 560 in a curved path away from the first passage 567, as shown in FIG. 16C. Immediately adjacent to the opening of each of the winding apertures 560, the first and second passages 567, 568 join together to form a common passage portion that is utilized by the trimmer line in the bump-feed operating mode as well as separately utilized by the trimmer line in the fixed-line operating mode. A junction corner 598 separates the first and second passages 567, 568 as the guide channel 566 extends inwardly from the winding aperture 560. The junction corner 598 is defined by the route of both the first and second passages 567, 568 and is configured to guide or otherwise direct the trimmer line within the guide channel 566 during the loading of the trimmer line. For example, as the end of the trimmer line is inserted through one of the holding apertures 562 for loading the trimmer line for the fixed-line operating mode, as the trimmer line passes through the first passage 567, the junction corner 598 directs the end of the trimmer line toward the winding aperture 560 so that the trimmer line can exit therethrough. Also, as the end of the trimmer line is inserted through one of the winding apertures 560 for loading the trimmer line for the bump-feed operating mode, as the trimmer line enters the guide channel 566, the junction corner 598 directs the end of the trimmer line into the second passage 568 to be secured therein during a winding/loading operation.

As the second passage 568 extends inwardly from the winding aperture 560 and past the junction corner 598, the second passage 568 is curved in a manner to avoid passing through the central core 599. The second passage 568 is further defined by the holding corner 597, wherein the holding corner 597 is a projection into the second passage 568 that narrows the width of the second passage 568. The holding corner 597 provides a narrowed entrance into the holding volume 596 that defines the end of the second passage 568. As the end of the trimmer line is inserted through one of the winding apertures 560 for loading the trimmer line for the bump-feed operating mode, the trimmer line is directed into the second passage 568 by the junction corner 598, wherein the end of the trimmer line passes through the holding corner 597 and into the holding volume 596. As the operator feeds the trimmer line into the winding aperture 560, when the trimmer line extends fully through the second passage 568, the end of the trimmer line contacting one of the walls defining the holding volume 596 provides haptic feedback to the operator that the trimmer line is fully inserted. Once the trimmer line has been fully inserted, the holding corner 597 contacts the trimmer line to prevent the trimmer line from being easily withdrawn from the guide channel 566 as the trimmer line is wound onto the spool 518 while also allowing for easy removal of the trimmer line from the guide channel 566 when the operator desires to remove the trimmer line therefrom.

In an embodiment, the winding apertures 560 are substantially coplanar with the holding apertures 562 on the central plate 542. The central plate 542 includes a pair of winding apertures 560 that extend from the outer radial edge of the central plate 542 to the wall defining the central bore 554. Each of the winding apertures 560 is configured to receive a portion of flexible trimmer line from a location external to the trimmer head 510 to allow the flexible trimmer line to be wound onto the spool 518 in the bump-feed operating mode. The winding apertures 560 also act as the exit to the guide channel 566 through which trimmer line exits in the fixed-line operating mode. The outer opening of the winding apertures 560 are alignable with corresponding first apertures 530 of the outer housing in the bump-feed operating mode to allow flexible trimmer line to be inserted through the first apertures 530 to be received through the winding apertures 560. The shape of the winding apertures 560 is configured such that once the flexible line is inserted through each winding aperture 560 and the spool 518 is rotated relative to the upper and lower housings 512, 514, then the flexible line is wound about the central bore 554 and into either the upper or lower channel 556, 558. Flexible trimmer line (not shown) inserted into one of the winding apertures 560 is windable into the upper channel 556, and flexible trimmer line (not shown) inserted into the other winding apertures 560 is windable into the lower channel 558, wherein the flexible line in each channel feeds a portion of the flexible line out of the corresponding winding aperture 560 in response to the bump head 516 being contacted with the ground in a line-feeding operation. In an embodiment, the end of each piece of flexible trimmer line is positively held or otherwise secured within the guide channel 566. In other embodiments, the curvature of the guide channel 566 and the holding corner 597 prevents accidental withdrawal of the flexible trimmer line.

The pair of holding apertures 562 are positioned on the central plate 542, oriented substantially in the same plane as the winding apertures 560, as shown in FIG. 16B. The holding apertures 562 are operatively connected to the winding aperture 560 by way of a guide channel 566 formed into the portion of the upper surface of the central plate 542 within the central bore 554. The holding apertures 562 are configured to receive trimmer line for use in a fixed-line operating mode. The holding apertures 562 are shaped such that when the trimmer line is inserted therein, the trimmer line travels along the guide groove 566 until it exits a corresponding winding aperture 560.

Figure 17B:
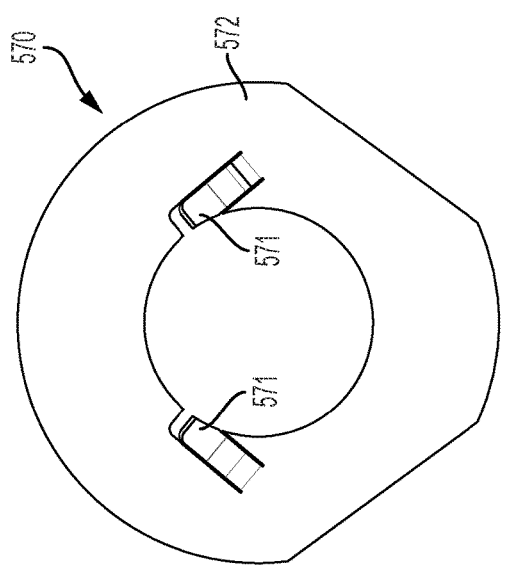
FIG. 17B is a top view of the cover ring shown in FIG. 17A.
Figure 17C:
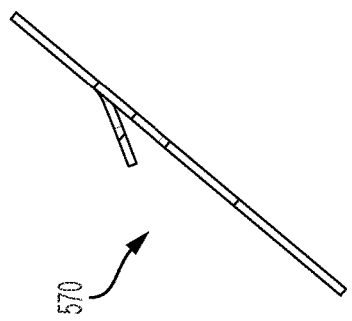
FIG. 17C is a side view of the cover ring shown in FIG. 17A.
Figure 17A:
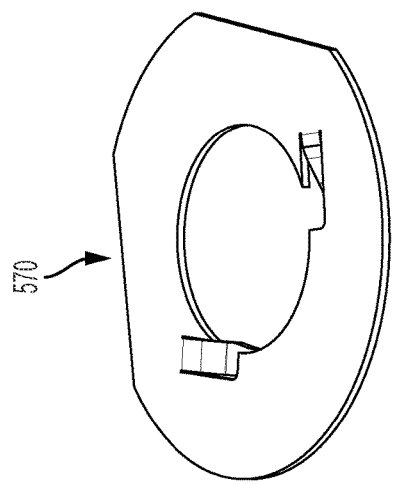
FIG. 17A is a top perspective view of an embodiment of a cover ring.

A cover ring 570, as shown in FIGS. 17A-17C, is positioned within the central bore 554 immediately adjacent to the upper surface of the central plate 542, wherein the cover ring 570 is press-fit into the central bore 554 to form a pair of fully-enclosed guide channels 566 that extend between each of the winding and holding apertures 560, 562. In an embodiment, the cover ring 570 is formed as an annular member having an upwardly-turned inner peripheral surface as well as an upwardly-turned outer diameter surface. The outer peripheral surface is scalloped or otherwise includes offsets that allow the cover ring 570 to be press-fit into the central bore 554. In the illustrated embodiment, the cover ring 570 is a truncated cylindrical member having a central bore hole formed therein. The cover ring 570 includes a pair of tabs 571 that are configured as cantilevered members that extend from the body 572. These cantilevered tabs 571 are configured to extend into the guide channels 566 of the spool 518. When the cover ring 570 is positioned within the central bore 554 of the spool 518, the cantilevered tabs 571 extend into the second passages 568 of the guide channels 566. The tabs 571 provide a biasing force onto the trimmer line inserted into the second passage for the bump-feed operating mode in order to assist in maintaining the trimmer line within the guide channel 566 as the trimmer line is wound onto the spool 518. It should be understood by one having ordinary skill in the art that the body 572 of the cover ring 570 is truncated in order to both reduce the amount of material necessary for the cover ring 570 but to also make installing the cover ring 570 into the central bore easier to grasp and maneuver.

The trimmer head 510 is switchable between the bump-feed operating mode and the fixed-line operating mode (and vice-versa) without the need to disassemble then reassemble trimmer head 510 in order to make the switch between operating modes. The trimmer head 510 also does not need to be disassemble (and subsequently re-assembled) in order to add/remove additional components to switch between operating modes. The trimmer head 510 is configured to be selectively switchable between the bump-feed operating mode and the fixed-line operating mode by simply removing the trimmer line previously installed for one mode and install the new trimmer line for the opposite operating mode. For both operating modes, the user/operator must first align the winding apertures 560 of the spool 518 with the first apertures 530 of the outer housing; for the fixed-line operating mode, the user/operator must also align the holding apertures 562 of the spool 518 with the second apertures 532. Once the apertures of the spool 518 are aligned with the corresponding apertures of the casing, the trimmer lines can be installed in the manner described below.

In an embodiment, a retainer 521, as shown in FIGS. 13 and 18A-18C, is positioned between the upper and lower housings 512, 514 such that the retainer 521 is located within and extends between the notch 527 formed in both the upper and lower housings 512, 514. The retainer 521 is located centrally between the pair of second apertures 532 in the upper and lower housings 512, 514. The retainer 521 provides a pinch point, or edge that contacts the trimmer line inserted through the second apertures 532 in order to prevent the trimmer line from withdrawing from the guide channels 566 of the spool 518 in the fixed-line operating mode. The retainer 521 is a curved rectangular member, wherein the radius of curvature is substantially the same as that of the sidewall of the upper and lower housings 512, 514. In an embodiment, the retainer 521 is formed of metal, but it should be understood by one having ordinary skill in the art that the retainer 521 can also be formed of plastic or any other material. The retainer 521 effectively reduces the cross-sectional area of the second apertures 532. The notches 527 of the upper and lower housings 512, 514 for receiving the retainer 521 are located within a first protrusion 590 extending radially outward from the sidewalls of the upper and lower housings 512, 514. The first protrusion 590 also defines the second apertures 532 through which trimmer line is inserted for the fixed-line operating mode. Due to the added offset weight of the first protrusion 590 and the retainer 521 located therewithin, a second protrusion 591 extends from the opposing side of the upper and lower housings 512, 514.

The bump head 516 is operatively connected to the spool 518 such that these components rotate together. In an embodiment, the bump head 516 and spool 518 include an interlocking mechanism 580 (FIG. 13) for attaching the bump head 516 directly to the spool 518 to form a unitary piece upon assembly. In another embodiment, the bump head 516 is separate from the spool 518 and is only in selective contact engagement therewith.

In an embodiment, the spring 520 is positioned within the central bore 554 of the spool 518, positioned adjacent to the upper surface of the central plate 542 and surrounding the bolt shaft 522 of the spool 518. The spring 520 is located between the upper surface of the central plate 542 and the inner surface of the upper housing 512 so as to bias the spool 518 downward toward the lower housing 514. In an embodiment, as the spring biases the spool 518 toward the lower housing 514, the ramps 546 of the lower plate 544 of the spool 518 engage the ribs 524 (FIG. 15A) of the lower housing 514.

For the bump-feed operating mode, the spring 520 biases the spool 518 toward the lower housing 514 such that the stop surface 552 of at least one ramp 546 that extends downwardly from the lower plate 544 of the spool 518 engages one of the ribs 524 extending upwardly from the inner surface of the lower housing 514. In an embodiment, the bump head 516 is rotated such that the ramp(s) 546 are rotated in a direction away from the ribs 524 of the lower housing 514 until the winding apertures 560 of the spool 518 are aligned with the first apertures 530 of the outer housing. Once the winding apertures 560 are aligned with the first apertures 530, a separate piece of trimmer line is inserted into each of the opposing first apertures 530. As the trimmer line is inserted into the first aperture 530, the trimmer line enters the winding aperture 560 of the spool 518 and the second passage 568 of the guide channel 566 until the trimmer line contacts the end of the holding volume 596 of the second passage 568. As the trimmer line passes through the second passage 568, the tab 571 of the cover ring 570 extending into the second passage 568 contacts the trimmer line to selectively secure the trimmer line within the second passage 568.

The operator then rotates the bump head 516 which causes the spool 518 to rotate relative to the upper and lower housings 512, 514. As the spool 518 rotates within the casing, the pair of flexible trimmer lines that were previously inserted into the opposing first apertures 530 are wound onto the spool 518 and into the upper and lower channels 556, 558 thereof. As the bump head 516 is rotated, the angled surfaces 550 of the ramps 546 on the lower plate 544 of the spool 518 slide along the ribs of the lower housing 514, which causes slight movement of the spool 518 along the rotational axis of the bolt shaft 522. This movement compresses the spring 520 such that when the spool 518 rotates, the ribs of the lower housing 514 pass beyond the stop surfaces 552 of the ramps 546, the spring 520 biases the spool 518 back toward the lower housing 514.

During operation, as the trimmer head 510 is pushed toward the ground, the bump head 516 contacts the ground which forces the bump head 516 toward the lower housing 514 and against the bias of the spring 520. As the bump head 516 moves toward the lower housing 514, the bump head 516 simultaneously pushes the spool 518 in the same direction. As the spool 518 moves toward the upper housing 512, the stop surfaces 552 of the ramps 546 on the lower plate 544 disengage from the ribs of the lower housing 514. Once the spool 518 is disengaged from the lower housing 514, the spool 518 tends to rotate slower than the lower housing 514 such that the ribs of the lower housing 514 move past the stop surfaces 552 and over the angled surfaces 550. The angled surfaces 550 of the ramps 546 on the upper plate 540 of the spool 518 are aligned with the ribs 524. As such, as the spool 518 is moved axially toward the upper housing 512, the ribs 524 contact the angled surfaces 550 which cause the ribs 524 to slide down the angled surfaces 550, thereby causing initial rotation of the spool 518 relative to the upper housing. Simultaneously, centrifugal forces of the trimmer line causes the spool 518 to continue to rotate relative to the lower housing 514, wherein such relative rotation results in additional trimmer line being fed out the first apertures 530 to increase the length of trimmer line extending from the trimmer head 510. As the trimmer head 510 is moved away from the ground, the spring 520 biases the spool 518 toward the lower housing 514 such that the stop surface(s) 552 of the ramp(s) 546 engage the ribs 524 of the lower housing 514 to prevent additional length of trimmer line from being fed out.

For the fixed-line operating mode of the trimmer head 510, the operator rotates the spool 518 twisting or turning the bump head 516 until the winding apertures 560 of the spool 518 are aligned with the first apertures 530 of the outer housing and the holding apertures 562 are aligned with the second apertures 532 of the outer housing. Once in this position, a length of semi-rigid trimmer line is inserted into the trimmer head 510 by inserting each opposing distal end of the trimmer line into one of the second apertures 532 of the outer housing and pushing on the trimmer line as each end of the trimmer line passes through the holding aperture 562 of the spool 518, then contacts and is guided through the guide channel 566 of the spool 518 until the junction corner 598 directs the end of the trimmer line out of the trimmer head 510 through the winding aperture 560 of the spool 518 and the corresponding first aperture 560 of the casing. Once both of the distal ends of the semi-rigid trimmer line extend laterally from the trimmer head 510, the operator can push the bend in the trimmer line until it is seated within the horizontal groove that extends between the second apertures 562 of the housing, thereby positively positioning or securing the semi-rigid trimmer line relative to the trimmer head 510. Although the spool 518 is not locked against all rotation relative to the upper and lower housings 512, 514, the strength of the semi-rigid trimmer line that extends through the winding apertures 560 of the spool 518 and the first apertures 530 of the outer housing effectively prevent such relative rotation.

In each embodiment of the trimmer head 10, 310, 410, 510 the first apertures formed by the upper and lower housings are configured to be able to allow only a single piece of trimmer line to extend therethrough. As such, an operator is unable to wind a length of flexible trimmer line onto the spool for use in a bump-feed operating mode and then simultaneously attempt to load a length of semi-rigid trimmer line onto the trimmer head for use in the fixed-line operating mode without first removing the flexible trimmer line. The first apertures are not sized to allow both the flexible trimmer line to pass therethrough while also attempting to feed the semi-rigid trimmer line through the first apertures. Similarly, an operator is unable to load a length of semi-rigid trimmer line onto the trimmer head for the fixed-line operating mode and then simultaneously attempt to load a length of flexible trimmer line through the first apertures for use in the bump-head operating mode.

It should be understood by one having ordinary skill in the art that the term "semi-rigid" with respect to trimmer line above is merely a term to differentiate between the type of trimmer line used in the fixed-line operating mode and the type of trimmer line used in the bump-feed operating, and this term is unrelated to the relative stiffness or flexibility of the trimmer line itself.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A multi-mode trimmer head releasably attachable to an outdoor handheld tool, said multi-mode trimmer head comprising:
    an upper housing;
    a lower housing releasably attached to said upper housing to form a casing, wherein said casing includes a pair of first apertures and a pair of second apertures;
    a spool positioned between said upper and lower housings, said spool having a central plate and a pair of guide channels formed into said central plate, and each of said guide channels includes a first passage and a second passage; and
    a bump head attached to said spool and extending from said lower housing for use in a bump-feed operating mode;
    wherein said first passages are configured to operate the trimmer head with a fixed-line trimmer line in a fixed-line operating mode, and each of said second passages is configured to operate said trimmer head with separate bump-line trimmer line in said bump-feed operating mode.

2. The multi-mode trimmer head of claim 1, wherein said central plate includes a portion extending radially outward from a wall defining a central bore and a portion extending radially inward from said wall defining said central bore wherein a portion of said central plate is located within said central bore, a pair of winding apertures and a pair of holding apertures are formed into said portion of said central plate extending radially outward from said wall defining said central bore, and each of said guide channels is connected to one of said pair of winding apertures and one of said pair of holding apertures.

3. The multi-mode trimmer head of claim 2, wherein said first passage of each of said guide channel extends between one of said pair of winding apertures and one of said pair of holding apertures.

4. The multi-mode trimmer head of claim 1, wherein each of said guide channels includes a junction corner which separates said first passage from said second passage.

5. The multi-mode trimmer head of claim 4, wherein said second passage includes a holding corner that defines a narrowed entrance into a holding volume.

6. The multi-mode trimmer head of claim 1, wherein said central plate includes a portion extending radially outward from said wall defining said central bore and a portion extending radially inward from said wall defining said central bore wherein a portion of said central plate is located within said central bore, and said spool also includes an upper plate and a lower plate, said upper and lower plates extending radially outward from said wall defining said central bore and positioned adjacent to opposite sides of said central plate.

7. The multi-mode trimmer head of claim 1 further comprising a cover ring positioned immediately adjacent to said guide channels for enclosing said guide channels.

8. The multi-mode trimmer head of claim 7, wherein said cover ring includes a pair of cantilevered tabs, wherein each of said cantilevered tabs extend into separate guide channels.

9. A multi-mode trimmer head releasably attachable to an outdoor handheld tool, said multi-mode trimmer head comprising:
- a casing having an upper housing and a lower housing, wherein said lower housing is releasably attached to said upper housing;
- a pair of opposing first apertures formed through said casing;
- a pair of second apertures formed through said casing, said second apertures positioned adjacent to each other;
- a spool positioned between said upper and lower housings, said spool having a wall defining a central bore therewithin and a central plate having both a portion extending radially outward from said wall defining said central bore and a portion positioned within said central bore that extends radially inward from said wall defining said central bore, said spool further including a pair of guide channels formed into said central plate, each of said guide channels includes a winding aperture formed into said central plate at one end and a holding aperture formed into said central plate at an opposing end, and an entrance into a holding volume wherein said winding apertures are alignable with said first apertures of said casing and said holding apertures are alignable with said second apertures of said casing; and
- a bump knob attached to said spool and extending downwardly from said lower housing;
- wherein the pair of second apertures and holding apertures are configured to operate the trimmer head with a fixed-line trimmer line in a fixed-line operating mode, and the winding apertures and the entrance into the holding volume are configured to operate the trimmer head with a pair of bump-line trimmer lines in a bump-feed operating mode.

10. The multi-mode trimmer head of claim 9 further comprising a cover ring positioned within said central bore and immediately adjacent to said guide channels for enclosing said guide channels.

11. The multi-mode trimmer head of claim 9, wherein rotation of said bump knob causes said spool to rotate within said casing.

12. The multi-mode trimmer head of claim 9, wherein each of said first and second guide channels includes a first passage and a second passage.

13. The multi-mode trimmer head of claim 9, wherein said winding apertures are positioned on opposite sides of said spool and said holding apertures are positioned adjacent to each other between said winding apertures.

* * * * *